(12) United States Patent
Kani et al.

(10) Patent No.: US 8,435,684 B2
(45) Date of Patent: May 7, 2013

(54) HYDROGEN PRODUCING APPARATUS, METHOD OF OPERATING HYDROGEN PRODUCING APPARATUS AND FUEL CELL POWER GENERATING SYSTEM

(75) Inventors: Yukimune Kani, Osaka (JP); Hidenobu Wakita, Kyoto (JP); Seiji Fujihara, Osaka (JP); Kunihiro Ukai, Nara (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 12/665,152

(22) PCT Filed: Jul. 2, 2008

(86) PCT No.: PCT/JP2008/001738
§ 371 (c)(1),
(2), (4) Date: Dec. 17, 2009

(87) PCT Pub. No.: WO2009/004803
PCT Pub. Date: Jan. 8, 2009

(65) Prior Publication Data
US 2010/0203403 A1      Aug. 12, 2010

(30) Foreign Application Priority Data

Jul. 4, 2007   (JP) ................................. 2007-175952
Sep. 6, 2007   (JP) ................................. 2007-231614

(51) Int. Cl.
*H01M 8/06*    (2006.01)
*G05D 9/00*    (2006.01)

(52) U.S. Cl.
USPC ............ 429/410; 429/423; 422/111; 422/625

(58) Field of Classification Search .................. 429/410, 429/423; 422/111, 625
See application file for complete search history.

(56) References Cited

U.S. PATENT DOCUMENTS 3,466,138 A * 9/1969 Spiegler et al. ............... 429/410
6,579,347 B1   6/2003 Wakita et al.
(Continued)

FOREIGN PATENT DOCUMENTS

GB    2 259 871 A    3/1993
JP    09-320622      12/1997
(Continued)

OTHER PUBLICATIONS

Supplementary Partial European Search Report for corresponding European Application No. EP08790137.7 dated Oct. 21, 2011.
(Continued)

*Primary Examiner* — Stephen J. Kalafut
(74) *Attorney, Agent, or Firm* — Renner, Otto, Boisselle & Sklar, LLP

(57) ABSTRACT

A hydrogen generation apparatus 1 includes a raw material supply unit 4 for controlling a flow rate of a raw material to be supplied from an external element and containing hydrocarbon and an odorizing component; an odorizing component removing section 5 containing an adsorbing agent for adsorbing the odorizing component contained in the raw material; a combustor 2 for combusting the raw material; a reformer 30 for generating hydrogen-containing gas from the raw material which has passed the odorizing component removing section 5 by a reforming reaction using combustion heat supplied from the combustor 2; and a controller 16 for controlling the raw material supply unit to, during driving after the adsorbing agent or the odorizing component removing section 5 is exchanged or after the adsorbing agent is regenerated, makes the flow rate of the raw material to be supplied from the external element higher than the flow rate during the driving immediately before the exchange or regeneration.

14 Claims, 11 Drawing Sheets

U.S. PATENT DOCUMENTS

| | | | |
|---|---|---|---|
| 7,074,375 B2 * | 7/2006 | Lampert et al. | 423/244.09 |
| 7,128,768 B2 * | 10/2006 | Liu et al. | 48/61 |
| 8,227,133 B2 * | 7/2012 | Oshikawa et al. | 429/410 X |
| 2004/0013917 A1 | 1/2004 | Ukai et al. | |
| 2006/0166056 A1 * | 7/2006 | Nakamura et al. | 429/22 |
| 2007/0093385 A1 | 4/2007 | Kim et al. | |

FOREIGN PATENT DOCUMENTS

| | | |
|---|---|---|
| JP | 10-237473 | 9/1998 |
| JP | 11-309329 | 11/1999 |
| JP | 2002-358992 | 12/2002 |
| JP | 2003-243005 | 8/2003 |
| JP | 2004-228016 | 8/2004 |
| JP | 2006-008459 | 1/2006 |
| JP | 2006-137649 | 6/2006 |
| JP | 2006-278120 | 10/2006 |
| JP | 2006-286279 | 10/2006 |
| JP | 2007-123269 | 5/2007 |
| JP | 2007-141857 | 6/2007 |
| JP | 2007-194142 | 8/2007 |
| JP | 2008-074674 | 4/2008 |
| WO | 2007/091632 A1 | 8/2007 |
| WO | 2007/148699 A1 | 12/2007 |
| WO | 2009/004803 A1 | 1/2009 |
| WO | 2009/031271 A1 | 3/2009 |

OTHER PUBLICATIONS

Supplementary European Search Report for related European Application No. EP08790494.2 dated Oct. 12, 2011.

International Search Report for Application No. PCT/JP2008/002534 mailed Sep. 8, 2009.

International Search Report for Application No. PCT/JP2008/002290 mailed Nov. 25, 2008.

Co-pending U.S. Appl. No. 12/671,766 submitted on Feb. 2, 2010 (application provided).

Co-pending U.S. Appl. No. 12/676,456 submitted on Mar. 4, 2010 (application provided).

International Search Report for corresponding application No. PCT/JP2008/001738 dated Sep. 30, 2008.

* cited by examiner

C: OUTPUT OF THE FUEL CELL
D: HOUSEHOLD POWER CONSUMPTION

HYDROGEN PRODUCING APPARATUS, METHOD OF OPERATING HYDROGEN PRODUCING APPARATUS AND FUEL CELL POWER GENERATING SYSTEM

TECHNICAL FIELD

The present invention relates to a hydrogen generation apparatus, a method for driving the same, and a fuel cell power generation system.

BACKGROUND ART

Fuel cells capable of power generation at a high efficiency even with a small size is being progressively developed as a key component of a power generation system for a distributed energy supply source. A supply system of hydrogen gas, which is a fuel necessary for power generation, is not sufficiently provided as a general infrastructure. Therefore, a hydrogen generation apparatus including a reformer for generating hydrogen-containing gas using a raw material (hydrocarbon-based gas) supplied from an existing fossil raw material infrastructure such as, for example, city gas, propane gas or the like (the hydrogen generation apparatus is also referred to as the "fuel reforming apparatus") is installed together with the fuel cell.

Hydrocarbon-based gas such as city gas, propane gas or the like which is supplied from an existing infrastructure usually contains an odorant, including an odorizer component such as a sulfur compound, a nitrogen-containing compound or the like, generally at a volume concentration of about several ppm's. Representative sulfur compounds used as an odorizer component include sulfides such as dimethylsulfide ($CH_3SCH_3$) and the like, mercaptans such as tertiary butylmercaptan (($CH_3$)$_3$CSH) and the like, and thiophenes such as tetrahydrothiophene and the like. Nitrogen-containing compounds used as an odorizer component include, for example, pyrazines such as 2-alkoxy-3-butylpyrazine and the like, nitrogen-based lower fatty acids, pyridines, and pyrimidines.

Such an odorant is added in order to detect a gas leak from a pipe or the like of the infrastructure line. However, especially an odorizer component contained in the odorant such as a sulfur compound may poison a catalyst used in the reformer. Accordingly, in order to suppress the poisoning influence of sulfur on the catalyst, the odorizer component needs to be removed from the raw material such as city gas, propane gas or the like before the raw material is supplied to the reformer.

Patent Documents Nos. 1 and 2 propose that in order to remove a sulfur compound from a raw material, the sulfur compound in the raw material is adsorbed by an adsorbing desulfurization section using an zeolite-based adsorbing agent.

With the adsorbing desulfurization section using an zeolite-based adsorbing agent, the adsorbing capacity on a sulfur compound is small. In order to sufficiently suppress the poisoning influence of sulfur on the catalyst used in the reformer, the adsorbing desulfurization section needs to be exchanged every certain time period. For example, Patent Document No. 3 proposes using an adsorbing agent having an indicator function, by which the time to exchange the adsorbing agent can be easily determined. Patent Document No. 4 filed by the present Applicant describes applying an adsorbing desulfurization section detachable from a power generation system using a fuel cell (fuel cell power generation system) and determining the time to exchange the adsorbing desulfurization section based on an accumulated amount of the raw material gas which has passed the section. Patent Document No. 5 proposes a method of networking a plurality of fuel cell power generation systems installed at houses and facilities to determine the time to exchange the adsorbing desulfurization section.

Instead of exchanging the adsorbing desulfurization section, the adsorbing agent contained in the adsorbing desulfurization section may be regenerated. A method for reproducing the adsorbing agent is proposed in, for example, Patent Documents Nos. 6 and 7.

Patent Document No. 1: Japanese Laid-Open Patent Publication No. 10-237473
Patent Document No. 2: Japanese Laid-Open Patent Publication No. 2004-228016
Patent Document No. 3: Japanese Laid-Open Patent Publication No. 2002-358992
Patent Document No. 4: Japanese Laid-Open Patent Publication No. 2006-8459
Patent Document No. 5: Japanese Laid-Open Patent Publication No. 2006-278120
Patent Document No. 6: Japanese Laid-Open Patent Publication No. 11-309329
Patent Document No. 7: Japanese Laid-Open Patent Publication No. 2007-123269

DISCLOSURE OF THE INVENTION

Problems to be Solved by the Invention

When a hydrocarbon-based raw material such as propane gas, city gas or the like (hereinafter, also referred to simply as the "raw material") is caused to pass an adsorbing desulfurization section using a zeolite-based adsorbing agent as proposed in Patent Documents Nos. 1 through 5, the zeolite-based adsorbing agent adsorbs a hydrocarbon component in addition to a sulfur component in the raw material (including a sulfur compound). Especially, the adsorbing ratio, on the hydrocarbon component, of a new adsorbing desulfurization section which has been passed by almost no raw material is high. As the accumulated amount of the raw material which has passed the adsorbing desulfurization section (distribution amount) increases, the adsorbing ratio on the hydrocarbon component decreases. When the amount of the hydrocarbon component adsorbed by the adsorbing desulfurization section reaches a prescribed amount (saturation), the adsorbing desulfurization section adsorbs almost no more hydrocarbon component. Therefore, when the hydrogen generation apparatus is driven immediately after the adsorbing desulfurization section which has been used is exchanged with a new adsorbing desulfurization section, the new adsorbing desulfurization section adsorbs a part of the hydrocarbon component in the raw material. Where the hydrogen generation apparatus is kept to be driven with no consideration of such adsorption, the amount of hydrogen-containing gas generated in the hydrogen generation apparatus becomes smaller than that before the adsorbing desulfurization section is exchanged. Thus, in the case where the hydrogen-containing gas generated in the hydrogen generation apparatus is to be supplied to a fuel cell, there is an undesirable possibility that the power which should be generated using the fuel cell may not be generated.

The reaction of generating hydrogen-containing gas from the raw material and steam (reforming reaction) is a heat adsorbing reaction. Therefore, the hydrogen generation apparatus includes a heating source for causing the reforming reaction. Usually with a fuel cell power generation system using a hydrogen generation apparatus, at the time of starting the hydrogen generation apparatus, hydrogen-containing gas generated in the hydrogen generation apparatus is combusted to be used as a heating source; and after the hydrogen generation apparatus is started, hydrogen off-gas is combusted to be used as a heating source. "Hydrogen off-gas" refers to hydrogen gas which is supplied to the fuel cell from the hydrogen generation apparatus but is not consumed by the fuel cell and discharged. In the above case, when the generation amount of hydrogen-containing gas decreases due to the adsorption of the hydrocarbon component in the adsorbing desulfurization section, the amount of hydrogen gas supplied to the fuel cell also decreases. As a result, the amount of hydrogen off-gas usable as a heating source of the hydrogen generation apparatus also decreases. Therefore, there is a possibility that the amount of heat necessary for the reforming reaction may not be obtained. Steam used for the reforming reaction is obtained by vaporizing water supplied to the hydrogen generation apparatus. At the time of starting the hydrogen generation apparatus, the heat necessary for vaporizing the water may not be supplied, and the delay in vaporizing the water may undesirably extend the time necessary for starting the hydrogen generation apparatus.

Where the hydrogen generation apparatus is kept to be driven with no consideration of the adsorption of the hydrocarbon component by the adsorbing desulfurization section and the amount of water supplied to the hydrogen generation apparatus for the reforming reaction is kept constant, there occurs a problem that the ratio between the carbon component in the raw material supplied to the reformer and water supplied to the hydrogen generation apparatus from the outside for the reaction with the raw material (steam-to-carbon ratio) may be deviated. There is also the following problem. The steam-to-carbon ratio increases due to the adsorption of the hydrocarbon component by the adsorbing desulfurization section, and as a result, the dew point of the hydrogen-containing gas supplied to the fuel cell from the hydrogen generation apparatus rises. Therefore, the power which should be generated using the fuel cell may not be generated.

In the above, the problems which occur in the case where the adsorbing desulfurization section for desulfurizing the hydrocarbon-based gas is exchanged are described as examples. Substantially the same problems occur in the case where only the adsorbing agent contained in the adsorbing desulfurization section is exchanged to a new adsorbing agent. Also in the case where the adsorbing agent is regenerated by, for example, the method described in each of Patent Documents Nos. 6 and 7, the adsorbing agent immediately after the regeneration adsorbs the hydrocarbon component in addition to the sulfur component as in the case where the adsorbing agent is exchanged to a new adsorbing agent. Therefore, substantially the same problems as above occur. Also in the case where hydrocarbon-based gas containing another odorizing component (for example, a nitrogen-containing compound) is used as a raw material instead of hydrocarbon-based gas containing a sulfur compound, there is a need to remove the odorizing component from the hydrocarbon-based gas using an adsorbing agent for adsorbing the another odorizing component. Therefore, substantially the same problems as above occur. In this specification, means for removing an odorizing component, such as a sulfur compound, a nitrogen-containing compound or the like, from a raw material gas using an adsorbing agent for adsorbing the odorizing component (for example, an adsorbing desulfurization section for adsorbing and thus removing a sulfur compound) is referred to as an "odorizing component removing section".

The present invention made in light of the above-described circumstance has an object of stably driving a hydrogen generation apparatus, including an odorizing component removing section for removing an odorizing component contained in the raw material, by suppressing the decrease in the generation amount of hydrogen-containing gas which is caused by an exchange of the odorizing component removing section or the odorant contained in the odorizing component removing section or by the regeneration of the odorant.

Means for Solving the Problems

A hydrogen generation apparatus according to the present invention is a hydrogen generation apparatus for generating hydrogen-containing gas from a raw material containing hydrocarbon and an odorizing component and comprises a raw material supply unit for controlling a flow rate of the raw material to be supplied from an external element; an odorizing component removing section containing an adsorbing agent for adsorbing the odorizing component contained in the raw material; a combustor for combusting the raw material; a reformer for generating hydrogen-containing gas from the raw material which has passed the odorizing component removing section by a reforming reaction using combustion heat supplied from the combustor; and a controller for controlling the raw material supply unit to, during driving after the adsorbing agent or the odorizing component removing section is exchanged or after the adsorbing agent is regenerated, make the flow rate of the raw material to be supplied from the external element higher than the flow rate during the driving immediately before the exchange or regeneration.

With such a structure, immediately after the odorizing component removing section or the adsorbing agent (hereinafter, collectively referred to as the "odorizing component removing member") is exchanged or immediately after the adsorbing agent is regenerated, namely, when the adsorbing ability of the adsorbing agent is high, the flow rate of the raw material to be supplied to the hydrogen generation apparatus from an external element can be increased.

In this specification, the "odorizing component" is defined as a component having an odor which can be sensed even at a relatively low concentration, and encompasses a component intentionally incorporated into the hydrocarbon-based gas such that a gas leak is detected and also a naturally occurring component contained in hydrocarbon-based gas.

The "raw material supplied from an external element" is defined as a raw material supplied from a source external to the apparatus such as a gas infrastructure line, a gas cylinder or the like to the inside of the hydrogen generation apparatus. Accordingly, the "flow rate of the raw material" controlled by the raw material supply unit is the flow rate of the raw material supplied from an external element to the inside of the hydrogen generation apparatus. In this specification, the flow rate of the raw material supplied from an external element is occasionally referred to as the "raw material flow rate M", and the flow rate of the raw material supplied to the odorizing component removing section is occasionally referred to as the "raw material flow rate m", in order to distinguish these flow rates. In the case where the hydrogen generation apparatus is structured to supply all the raw material supplied from an external element to the odorizing component removing section, the raw material flow rate M is equal to the raw material flow rate m.

The "exchange" of the odorizing component removing member is defined as the exchange to an odorizing component removing member having a higher adsorbing ratio on the odorizing component and the hydrocarbon component. Accordingly, "the exchange of the odorizing component removing member" encompasses, for example, replacing a cartridge-type odorizing component removing section with a new cartridge, and removing an adsorbing agent contained in an odorizing component removing section and putting a new adsorbing agent, but does not encompass replacing with an odorizing component removing member having an equivalent adsorbing ratio on the odorizing component and the hydrocarbon component (re-installing the cartridge once removed from the hydrogen generation apparatus, replacing a new cartridge with another new cartridge, etc.).

Meanwhile, the "regeneration" of the adsorbing agent means desorbing at least a part of the odorizing component and hydrocarbon adsorbed by the adsorbing agent. The regeneration encompasses, for example, removing a cartridge-type odorizing component removing section from the hydrogen generation apparatus and installing the odorizing component removing section again in the hydrogen generation apparatus after the odorizing component and hydrocarbon adsorbed to the adsorbing agent is desorbed, and also desorbing the odorizing component and hydrocarbon adsorbed to the adsorbing agent in the state where the odorizing component removing section is in the hydrogen generation apparatus.

Making the flow rate of the raw material higher "than the flow rate during the driving immediately before the exchange or regeneration" means increasing the flow rate from the raw material flow rate $M_0$ to be controlled in accordance with the driving condition during the driving immediately before the exchange or regeneration (such driving is also referred to as the "normal state") (such a flow rate $M_0$ is referred to as the "normal state raw material flow rate").

The hydrogen generation apparatus may include a raw material entrance through which the raw material is introduced from the outside of the apparatus and a gas path connected to the raw material entrance. In this case, the raw material supply unit is located so as to control the raw material flow rate M in the gas path. In the case where the gas path has a branching section, it is preferable to locate the raw material supply unit on the raw material entrance side with respect to the branching section. The raw material supply unit includes, for example, a mass flow controller, a pump and the like.

In a preferable embodiment, the hydrogen generation apparatus further comprises an exchange/regeneration information acquisition unit for acquiring odorizing component removing member exchange/regeneration information which indicates that the adsorbing agent or the odorizing component removing section has been exchanged or that the adsorbing agent has been regenerated. When the odorizing component removing member exchange/regeneration information is acquired by the exchange/regeneration information acquisition unit, the controller controls the raw material supply unit to make the flow rate of the raw material higher than the flow rate during the driving immediately before the acquisition.

At least in starting processing during the driving after the exchange, the controller controls the raw material supply unit to make the flow rate of the raw material higher than the flow rate in the starting processing immediately before the exchange or regeneration.

With such a structure, when the fuel reformer is started immediately after the exchange or regeneration, the supply amount of the raw material is made larger than the supply amount before the exchange or regeneration. Therefore, even though the raw material is adsorbed by the adsorbing agent, the decrease of the raw material which has passed the odorizing component removing section is suppressed. Owing to this, the hydrogen generation apparatus does not need a long time to be started and the operation of the hydrogen generation apparatus is stabilized.

In a preferable embodiment, at least in starting processing during the driving after the exchange or regeneration, the controller controls the raw material supply unit to increase the flow rate of the raw material such that a combusting amount of the combustor is equivalent to the combusting amount of the combustor in starting processing immediately before the exchange or regeneration.

With such a structure, the combustion heat is stably supplied from the combustor to the reformer. Therefore, the hydrogen-containing gas can be stably generated by the reformer. This stabilizes the operation of the hydrogen generation apparatus. In other words, when the combustion heat of an amount closer to a prescribed amount is supplied from the combustor to the reformer, the temperature of the reformer (and so, of the hydrogen generation apparatus) rises to be close to a prescribed temperature. Therefore, the hydrogen generation apparatus can be started normally.

In a preferable embodiment, the hydrogen generation apparatus further comprises an air supply unit for supplying combustion air to the combustor. At least in starting processing during the driving after the exchange or regeneration, the controller controls the air supply unit to change a flow rate of the combustion air to be supplied to the combustor such that an air ratio of the combustor is equivalent to the air ratio of the combustor in starting processing immediately before the exchange.

With such a structure, the combustion heat generated by the combustor can be kept substantially the same before and after the exchange or regeneration. Therefore, the hydrogen-containing gas can be stably generated by the reformer. This stabilizes the operation of the hydrogen generation apparatus. In other words, when the combustion heat of an amount closer to a prescribed amount is supplied from the combustor to the reformer, the temperature of the reformer (and so, of the hydrogen generation apparatus) rises to be close to a prescribed temperature. Therefore, the hydrogen generation apparatus can be started normally.

In this specification, the "air ratio" is represented by the following expression where an amount of air necessary to completely combust the raw material is Va and an amount of air actually supplied is Vb.

$$\text{Air ratio} = Vb/Va$$

The air ratio is ideally 1. When the amount of air actually supplied is decreased, the CO concentration in the combustion exhaust gas rises. Therefore, the air ratio is usually set to about 1.3 to 1.8 although being varied depending on the type of the combustor.

When an accumulated amount of the raw material to be supplied to the odorizing component removing section becomes equal to or larger than a prescribed threshold value during the driving after the exchange or regeneration, the controller may control the raw material supply unit to return the flow rate of the raw material to the flow rate of the raw material during the driving before the exchange or regeneration.

Owing to such a structure, when the accumulated amount of the raw material supplied to the odorizing component removing section exceeds a prescribed threshold value and the adsorbing agent in the odorizing component removing section does not substantially adsorb the raw material anymore (the adsorbing amount of the raw material is saturated), the flow rate of the raw material to be subsequently supplied to the odorizing component removing section or the flow rate of the air to be subsequently supplied to the combustor can be returned to the supply amount before the odorizing component removing member exchange/regeneration information is acquired. Thus, the operation of the hydrogen generation apparatus can be returned to the normal operation.

In this specification, the "accumulated amount of the raw material (also referred to as the "accumulated flow rate")" is defined to encompass a value directly measured by an accumulated flow meter or the like located on a path of the raw material gas and also a value indirectly obtained in consideration of the amount of power generation by the fuel cell (in the case where the hydrogen generation apparatus is used in a fuel cell power generation system), the supply amount of water to the reformer, the number of times of start/stop or the like. The "prescribed threshold value" of the accumulated amount is preset based on the accumulated amount of the raw material supplied to the odorizing component removing section which is necessary to saturate the adsorbing amount of the hydrocarbon component by odorizing component removing section (adsorption saturation distribution amount). The adsorption saturation distribution amount will be described specifically later.

When an accumulated amount of the raw material to be supplied to the odorizing component removing section becomes equal to or larger than a prescribed threshold value during the driving after the exchange or regeneration, the controller may control the air supply unit to return the flow rate of the combustion air to be supplied to the combustor to the flow rate of the combustion air during the driving before the exchange or regeneration.

The controller may change the prescribed threshold value in accordance with an adsorbing ability of the odorizing component removing section on a prescribed hydrocarbon component contained in the raw material.

The adsorbing amount of the raw material by the adsorbing agent contained in the odorizing component removing section varies in accordance with the type and amount of the adsorbing agent. With the above structure, the prescribed threshold value for the accumulated amount of the raw material to be supplied to the odorizing component removing section is appropriately changed in accordance with the type and amount of the adsorbing agent. Therefore, for example, in the case where the odorizing component removing section is exchanged to an odorizing component removing section using a different type of adsorbing agent, when the adsorbing agent does not substantially adsorb the raw material anymore, the flow rate of the raw material to be supplied to the odorizing component removing section or the flow rate of the combustion air to be supplied to the combustor can be quickly returned to the flow rate before the odorizing component removing member exchange/regeneration information is acquired. Accordingly, the amount of the adsorbed hydrocarbon can be appropriately compensated for, and a more stable operation can be realized.

The controller may control the raw material supply unit to return, step by step, the flow rate of the raw material to the flow rate of the raw material during the driving before the exchange or regeneration in accordance with the accumulated amount of the raw material supplied to the odorizing component removing section after the exchange or regeneration.

Owing to this, the fluctuation range of the amount of the raw material which has passed the odorizing component removing section can be narrowed. This further stabilizes the hydrogen generation apparatus.

The controller may control the raw material supply unit to return, step by step, the flow rate of the raw material to the flow rate of the raw material during the driving before the exchange or regeneration.

The controller may control the air supply unit to return, step by step, the flow rate of the combustion air to be supplied to the combustor to the flow rate of the combustion air during the driving before the exchange or regeneration in accordance with the accumulated amount of the raw material supplied to the odorizing component removing section after the exchange or regeneration, or in accordance with the adsorbing ability of the odorizing component removing section.

With such a structure, the fluctuation range of the combustion heat generated when the combustion gas is combusted by the combustor can be narrowed. Therefore, the hydrogen-containing gas can be stably generated by the reformer. This further stabilizes the hydrogen generation apparatus. In other words, when the combustion heat of an amount closer to a prescribed amount is supplied from the combustor to the reformer, the temperature of the reformer (and so, of the hydrogen generation apparatus) rises to be close to a prescribed temperature. Therefore, the hydrogen generation apparatus can be started normally.

A fuel cell power generation system according to the present invention comprises the above-described hydrogen generation apparatus; and a fuel cell for performing power generation using the hydrogen-containing gas generated by the hydrogen generation apparatus.

Another hydrogen generation apparatus according to the present invention comprises a mechanism for detachably holding an odorizing component removing section containing an adsorbing agent, which passes an hydrocarbon-based raw material containing an odorizing component and adsorbs the odorizing component in the raw material; a water supply unit for supplying water; a reformer for generating hydrogen-containing gas by a reforming reaction of the raw material which has passed the odorizing component removing section and the water supplied from the water supply unit; a raw material supply unit for controlling a flow rate of the raw material to be supplied to the odorizing component removing section; and a controller for controlling an operation of the raw material supply unit. When it is detected that the odorizing component removing section or the adsorbing agent has been exchanged or that the adsorbing agent has been regenerated, the controller controls the operation of the raw material supply unit to make the flow rate of the raw material higher than the flow rate before the exchange or regeneration. When an accumulated flow rate of the raw material reaches reached a preset level after the exchange or regeneration, the controller controls the operation of the raw material supply unit to return the increased flow rate of the raw material to the flow rate before the exchange or regeneration.

A method for driving a hydrogen generation apparatus according to the present invention is a method for driving a hydrogen generation apparatus for generating hydrogen-containing gas from a raw material containing hydrocarbon and an odorizing component. The hydrogen generation apparatus comprises a raw material supply unit for controlling a flow rate of the raw material to be supplied from an external element; an odorizing component removing section containing an adsorbing agent for adsorbing the odorizing component contained in the raw material; a combustor for combusting the raw material; and a reformer for generating hydrogen-containing gas from the raw material which has passed the odorizing component removing section by a reforming reaction using combustion heat supplied from the combustor. During driving after the adsorbing agent or the odorizing component removing section is exchanged or after the adsorbing agent is regenerated, the raw material supply unit makes the flow rate of the raw material to be supplied from the external element higher than the flow rate during the driving immediately before the exchange or regeneration.

A method for driving a fuel cell power generation system according to the present invention is a method for driving a fuel cell power generation system comprising a hydrogen generation apparatus for generating hydrogen-containing gas from a raw material containing hydrocarbon and an odorizing component, and a fuel cell for performing power generation using the hydrogen-containing gas generated by the hydrogen generation apparatus. The hydrogen generation apparatus comprises a raw material supply unit for controlling a flow rate of the raw material to be supplied to the hydrogen generation apparatus; an odorizing component removing section containing an adsorbing agent for adsorbing the odorizing component contained in the raw material; a combustor for combusting the raw material; and a reformer for generating hydrogen-containing gas from the raw material which has passed the odorizing component removing section by a reforming reaction using combustion heat supplied from the combustor. During driving after the adsorbing agent or the odorizing component removing section is exchanged or after the adsorbing agent is regenerated, the raw material supply unit makes the flow rate of the raw material to be supplied from the external element higher than the flow rate during the driving immediately before the exchange or regeneration.

Another method for driving a hydrogen generation apparatus according to the present invention is a method for driving a hydrogen generation apparatus for generating hydrogen-containing gas, after introducing a raw material containing hydrocarbon and an odorizing component to an odorizing component removing section for adsorbing and thus removing the odorizing component contained in the raw material, by a reforming reaction of the raw material which has passed the odorizing component removing section and water. Where a flow rate of the raw material to be supplied to the odorizing component removing section when an adsorbing ratio of the odorizing component removing section on a hydrocarbon component is substantially zero is a base flow rate, when the adsorbing ratio of the odorizing component removing section on the hydrocarbon component is higher than a prescribed value, the raw material is supplied to the odorizing component removing section in a flow rate higher than the base flow rate.

Effects of the Invention

According to the present invention, even immediately after the odorizing component removing section or the adsorbing agent contained in the odorizing component removing section (odorizing component removing member) is exchanged or even immediately after the adsorbing agent is regenerated, the hydrogen generation apparatus can be stably driven. The starting time period of the hydrogen generation apparatus after the exchange or regeneration can be shortened as compared with the starting time period in the conventional art.

In addition, during the driving after the exchange or regeneration, the flow rate of the raw material to be supplied to the odorizing component removing section may be increased. Owing to this, the decrease of the amount of the raw material to be supplied from the odorizing component removing section to the reformer can be suppressed. Therefore, the steam-to-carbon ratio in the reformer can be kept at an appropriate value. The decrease of the generation amount of the hydrogen-containing gas due to the exchange of the odorizing component removing member or the regeneration of the adsorbing agent can be suppressed.

DESCRIPTION OF THE REFERENCE NUMERALS

Figure 1:
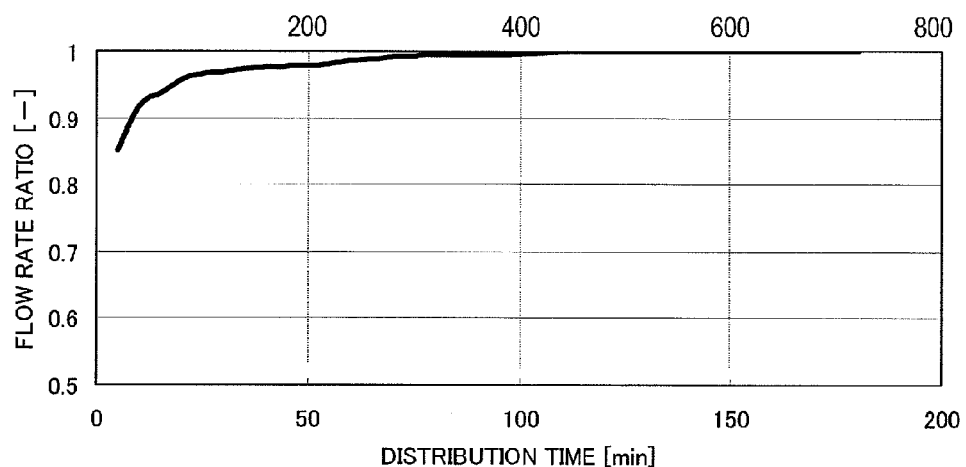
FIG. 1 is a graph showing measurement results of the flow rate ratio between at an entrance and at an exit of a new adsorbing desulfurization section (odorizing component removing section).

| | |
|---|---|
| 1, 1', 200 | Hydrogen generation apparatus |
| 2 | Combustor |
| 3 | Water supply unit |
| 4 | Raw material supply unit |
| 5 | Adsorbing desulfurization section (odorizing component removing section) |
| 6 | Gas infrastructure line |
| 7 | Connection section |
| 7' | Branching section |
| 8 | Fuel cell |
| 9a, 9b | Gas switching section |
| 10 | Raw material supply path |
| 11 | Reformer unit bypass path |
| 12 | Hydrogen gas supply path |
| 13 | Fuel cell bypass path |
| 14 | Off-gas path |
| 15 | Combustion gas supply path |
| 16 | Controller (controller) |
| 17 | Input section |
| 18 | Combustion fan (combustion air supply unit) |
| 19 | Air supply unit |
| 20 | Steam reforming section |
| 24 | Shift converting section |
| 26 | Selective oxidation section |
| 30 | Reformer |
| 100, 500 | Fuel cell power generation system |
| 101 | Gas infrastructure |
| 102 | Raw material supply unit |
| 103 | Accumulated flow meter |
| 104 | Raw material supply path |
| 105 | First open/close valve |
| 106 | Sensor (exchange/regeneration information acquisition unit) |
| 107 | Adsorbing desulfurization section (odorizing component removing section) |
| 109 | Second open/close valve |
| 200 | Hydrogen generation apparatus |
| 111 | Branching section |
| 113 | Third open/close valve |
| 114 | Combustion raw material gas supply flow path |
| 115 | Flow rate adjusting valve |
| 117 | Reformer |
| 119 | Combustor |
| 120 | Fuel processing unit |
| 121 | Combustion air supply unit |
| 125 | Water supply unit |
| 127 | Hydrogen gas supply path |
| 131 | Fuel gas discharge path |
| 133 | Fuel cell bypass path |
| 140 | Controller |
| 150 | Fuel cell |
| 151 | Polymer electrolytic film |
| 152 | Anode |
| 153 | Cathode |
| 160 | Oxidizing agent gas supply unit |
| 162 | Oxidizing agent gas supply flow path |
| 164 | Oxidizing agent gas discharge flow path |
| 171 | First three-way valve |
| 172 | Second three-way valve |
| 181 | Pressure boost pump |
| 182 | Mass flow controller |
| 183 | Flow meter |
| 184 | Branching section |
| 185 | Gas chromatographer |
| 186 | Fan |
| 187 | Burner |
| 301, 302 | Flow of raw materialgas |
| 303 | Flow of fuel gas |
| 304 | Flow of off-gas |

BEST MODE FOR CARRYING OUT THE INVENTION

In order to investigate the above problems caused by the exchange and the regeneration of an odorizing component removing member, the present inventors measured the adsorbing characteristic of a new odorizing component removing section (herein, an adsorbing desulfurization section for adsorbing and thus removing a sulfur component). The method and results of the measurement will be described. Herein, the "new odorizing component removing section (or adsorbing desulfurization section)" is an odorizing component removing section (or adsorbing desulfurization section) which has not been passed by any raw material gas yet.

The measurement was carried out using a new adsorbing desulfurization section filled with a zeolite-based adsorbing agent which has not contacted the raw material almost at all. The amount of the adsorbing agent to be put in the adsorbing desulfurization section was 400 g (weight in a dried state). As the raw material to pass the adsorbing desulfurization section, city gas 13A supplied from a gas infrastructure line 6 of Osaka Gas Co., Ltd. was used. Table 1 shows the composition of 13A of Osaka Gas Co., Ltd. used in this measurement (refer to MSDS provided by Osaka Gas Co., Ltd.).

TABLE 1

| Component | Volume % |
|---|---|
| Methane | 88.9 |
| Ethane | 6.8 |
| Propane | 3.1 |
| Butane | 1.2 |

This adsorbing desulfurization section was set in a hydrogen generation apparatus as described later, and hydrogen-containing gas generated by the hydrogen generation apparatus was supplied to a fuel cell to generate power. The target value for the power generation by the fuel cell was set to 1 kV or the vicinity thereof, and the above-described raw material was distributed in the adsorbing desulfurization section at 4 L/min. (20° C.; converted into the value at 1 atmospheric pressure), which is the flow rate of 13A necessary for power generation of 1 kW. At this point, the flow rate of the raw material before the raw material passes the adsorbing desulfurization section (entrance-side flow rate) and the flow rate of the raw material after the raw material passes the adsorbing desulfurization section (exit-side flow rate) were measured, and the ratio of the exit-side flow rate with respect to the entrance-side flow rate (hereinafter, referred to simply as the "flow rate ratio") was found.

The measurement results are shown in FIG. 1. FIG. 1 is a graph showing a change of the flow rate ratio with respect to the distribution time or the distribution amount of the raw material (accumulated flow rate). As understood from the results, when the system starts to be driven immediately after a new adsorbing desulfurization section is installed, a part of hydrocarbon in the raw material is adsorbed by the adsorbing desulfurization section, and thus the flow rate of the raw material after the raw material passes the adsorbing desulfurization section (exit-side flow rate) decreases from the flow rate of the raw material before the raw material passes the adsorbing desulfurization section (entrance-side flow rate). Therefore, the flow rate ratio (exit-side flow rate/entrance-side flow rate) is lower than 1. In the hydrogen generation apparatus, the raw material which has passed the adsorbing desulfurization section and water are supplied to a reformer including a steam reforming section, and hydrogen-containing gas is generated in the reformer. Accordingly, when the flow rate ratio is lower than 1, the amount of the hydrogen-containing gas generated in the reformer is smaller than the amount in the case where hydrocarbon is not adsorbed (flow rate ratio=1).

As shown in FIG. 1, as the accumulated amount of the raw material which passed the adsorbing desulfurization section increases, the flow rate ratio gradually becomes closer to 1. This means that as the accumulated flow rate of the raw material increases, the amount of hydrocarbon in the raw material which is adsorbed by the adsorbing desulfurization section gradually decreases. When the accumulated flow rate further increases and reaches a prescribed amount, the flow rate ratio becomes about 1. This is considered to occur because the adsorbing amount of the hydrocarbon component by the adsorbing desulfurization section saturates. In this specification, the accumulated flow rate necessary to saturate such an adsorbing amount of the hydrocarbon component is referred to as the "adsorption saturation distribution amount". From the above results, it is understood that the adsorption saturation distribution amount of the adsorbing desulfurization section used here is, for example, about 700 L.

Next, the present inventors performed qualitative and quantitative analyses on the raw material which has passed the adsorbing desulfurization section. The adsorbing desulfurization section was substantially the same as that used in the above-described measurement. The method and results of the analyses will be described.

First, an analysis was made on the raw material which has not passed the adsorbing desulfurization section (pre-adsorbing desulfurization section raw material sample) N0. Then, the raw material was caused to pass the adsorbing desulfurization section at substantially the same flow rate as that described above. Each time when the accumulated flow rate of the raw material which passed the adsorbing desulfurization section reached 240 L, 480 L and 720 L, an analysis was made on the respective raw material which passed the adsorbing desulfurization section (post-adsorbing desulfurization section raw material samples) N1, N2, N3. The quantitative analysis on the pre-adsorbing desulfurization section raw material sample N0 and the post-adsorbing desulfurization section raw material sample N1 through N3 was made using gas chromatography after sampling the raw materials. The analysis on the components of these raw material samples (qualitative analysis) was made by substantially the same method as inflammable gas component analysis of city gas generally used, and so the method will not be described.

Figure 2:
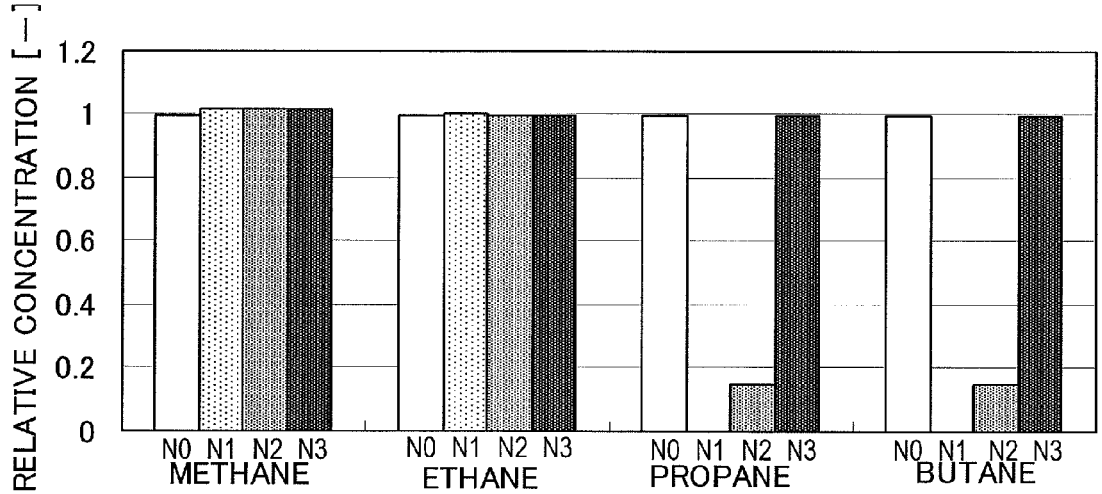
FIG. 2 is a graph showing measurement results of the composition of a raw material before and after the raw material passes the new adsorbing desulfurization section.

The analysis results are shown in FIG. 2. FIG. 2 is a graph showing relative concentrations of hydrocarbon (methane, ethane, propane and butane) contained in the pre-adsorbing desulfurization section raw material sample N0 and the post-adsorbing desulfurization section raw material samples N1 through N3. The "relative concentration" is a ratio of the concentration of the hydrocarbon contained in each raw material sample with respect to the concentration of the hydrocarbon contained in the pre-adsorbing desulfurization section raw material sample N0.

From the measurement results shown in FIG. 2, it is understood that the adsorbing amount of methane, which is a main component of city gas, is saturated immediately after the raw material starts passing the adsorbing desulfurization section, whereas the adsorbing amounts of propane and butane which contain a larger number of carbon atoms in the molecules are saturated after a certain amount of the raw material passes the adsorbing desulfurization section.

By comparing the results of the two measurements described above (FIG. 1 and FIG. 2), the following is confirmed. When the raw material passes the adsorbing desulfurization section until the accumulated flow rate reaches 240 L, as shown in FIG. 1, the gas distribution ratio is about 0.96 (data with the distribution time of 60 min.). This indicates that about 4% of the raw material of the amount before the raw material passes the adsorbing desulfurization section is adsorbed. By contrast, when the accumulated flow rate reaches 240 L, as shown in FIG. 2, almost all the amounts of propane and butane in the raw material are adsorbed by the adsorbing desulfurization section. As shown in Table 1, a sum of the components of propane and butane is 4.3% on the volume basis. Therefore, it is understood that when the accumulated flow rate reaches 240 L, almost all the amounts of propane and butane in the raw material are adsorbed by the adsorbing desulfurization section, and the flow rate of the raw material decreases by the corresponding volume. Thus, the measurement results shown in FIG. 1 and FIG. 2 match Table 1 showing the components.

As described above, in the case where a new adsorbing desulfurization section is set in the hydrogen generation apparatus, when the installed hydrogen generation apparatus starts to be driven, a part of the hydrocarbon component in the raw material is adsorbed by the adsorbing desulfurization section. Therefore, the flow rate of the raw material N1 which has passed the adsorbing desulfurization section is lower than the flow rate of the raw material N0 which has not passed the adsorbing desulfurization section. When more raw material passes the adsorbing desulfurization section, the adsorbing amounts of the hydrocarbon components are saturated in the order from an adsorbing amount of a hydrocarbon component having a smaller number of carbon atoms in the molecules. Thus, as shown in FIG. 1, the adsorbing amount decreases and the flow rate ratio approaches 1. However, the components having 2 or more carbon atoms (ethane, propane, butane) each generate a larger amount of hydrogen than methane for the same volume. Therefore, when such a component is adsorbed, the generation amount of hydrogen-containing gas decreases by equal to or more than the volume decreased by the adsorption. For example, where the accumulated flow rate is 240 L, the volume of the raw material decreases by about 4% as described above. This corresponds to a decrease of about 10% when being converted on the volume basis to the amount of hydrogen gas which can be generated. Accordingly, when the power to be generated is set based on the flow rate of the raw material which has not passed the adsorbing desulfurization section and power generation is performed by the fuel cell, the amount of hydrogen required by the fuel cell is larger than the actual generation amount of hydrogen. As a result, as understood from this, the power generation state becomes unstable, or the amount of the hydrogen off-gas supplied to a combustor of the hydrogen generation apparatus decreases and so an amount of heat necessary for the reforming reaction cannot be supplied.

In the above, the measurement results of the adsorbing characteristic of the new adsorbing desulfurization section on the hydrocarbon component are described. A regeneration adsorbing desulfurization section which is obtained by reproducing a used adsorbing desulfurization section shows substantially the same tendency of adsorbing characteristic as above. An odorizing component removing section for removing an odorizing component other than a sulfur compound (for example, a nitrogen-containing compound) may occasionally show substantially the same tendency of adsorbing characteristic on the hydrocarbon component as above. Namely, a new odorizing component removing section or a regenerated odorizing component removing section has a high adsorbing ratio on the hydrocarbon component; and as the distribution amount of the raw material which has passed such an odorizing component removing section increases, the adsorbing ratio on the hydrocarbon component decreases.

The present invention is made based on the above-described measurement results and the examination results, and is characterized in that the flow rate of the raw material to be supplied to the odorizing component removing section is controlled in consideration of the amount, of the hydrocarbon component contained in the raw material, which will be adsorbed by the odorizing component removing section such as an adsorbing desulfurization section. Owing to this, a hydrogen generation apparatus which is capable of supplying a necessary amount of hydrogen-containing gas with certainty even after the odorizing component removing member is exchanged or after the adsorbing agent is regenerated can be provided.

In a preferable embodiment of the present invention, during the driving after the odorizing component removing section or the adsorbing agent is exchanged or after the adsorbing agent is regenerated, the flow rate of the raw material to be supplied from an external element is made higher than the flow rate during the driving immediately before the exchange or regeneration.

When the flow rate of the raw material to be supplied from the external element is increased, the raw material of the increased portion may be supplied to the odorizing component removing section or supplied to the combustor of the hydrogen generation apparatus as combustion bas without being passed through the odorizing component removing section. Alternatively, the flow rate of the raw material to be supplied to the odorizing component removing section may be increased and also a part of the increased portion may be supplied to the combustor as combustion gas.

When the flow rate of the raw material to be supplied to the odorizing component removing section is increased, even though the raw material (hydrocarbon component) is adsorbed to the adsorbing agent, the decrease of the flow rate of the raw material which has passed the odorizing component removing section is suppressed by the increased portion of the raw material flow rate. As a result, the amount of the raw material which passes the odorizing component removing section and is reformed by the reformer, and also the amount of the hydrogen-containing gas generated by the reformer, are stabilized. The hydrogen generation apparatus does not need a long time to be started, and the operation of the hydrogen generation apparatus is more stabilized. When at least a part of the increased portion of the raw material is supplied to the combustor of the hydrogen generation apparatus as combustion gas, the decrease of the combustion gas (hydrogen-containing gas, hydrogen off-gas, etc.) caused by the adsorption of the hydrocarbon component is suppressed. Therefore, the starting time period can be shortened and the operation of the hydrogen generation apparatus can be more stabilized.

When the raw material is supplied immediately after the exchange or regeneration, namely, when the adsorbing ability of the adsorbing agent is high, there may be a case where the flow rate of the raw material flowing out from the odorizing component removing section (composition of the raw material) is not constant because the raw material is adsorbed by the adsorbing agent. When such a raw material is supplied to the reformer, the composition of the hydrogen-containing gas generated by the reformer may become unstable. In this case, however, the raw material flowing out from the odorizing component removing section may be supplied to the combustor, instead of the reformer, and used as combustion gas. When the raw material is used as the combustion gas, the raw material is not consumed in waste and the energy loss is small. When a sufficient amount of the raw material is supplied to the combustor as the combustion gas, the decrease of the temperature rise rate of the reformer (and so, of the hydrogen generation apparatus) can be suppressed. Therefore, the hydrogen generation apparatus can be started normally, i.e., within substantially the same time period as before the exchange/regeneration.

Before a new odorizing component removing section is installed in the hydrogen generation apparatus, the processing of causing the odorizing component removing section to adsorb the hydrocarbon component (saturation processing) can be executed, so that the adsorbing agent is suppressed from adsorbing the hydrocarbon component in the raw material. However, such saturation processing consumes the raw material in waste. By contrast, in this embodiment, the raw material which has been used for the saturation processing can be sent to the reformer or supplied to the combustor and used as combustion gas. Therefore, the raw material is not consumed in waste and the energy loss is small. When the raw material of an amount close to a prescribed amount is supplied to the combustor as the combustion gas, the temperature of the reformer (and so, of the hydrogen generation apparatus) rises to be close to a prescribed temperature. Therefore, the hydrogen generation apparatus can be started normally.

During the first-time driving after the adsorbing agent or the odorizing component removing section is exchanged or after the adsorbing agent is regenerated, the hydrogen generation apparatus may be driven so as to make the flow rate of the raw material supplied from an external element higher than the flow rate during the driving before the exchange or regeneration. This can more stabilize the operation of the hydrogen generation apparatus. Herein, the "first-time driving" does not mean, for example, the test or checking driving for checking on ignition, leak or the like in the hydrogen generation apparatus but means the driving for flowing the raw material through the odorizing component removing section in a full scale to generate hydrogen-containing gas or the driving for supplying the hydrogen-containing gas to the fuel cell to perform power generation.

Embodiment 1

Hereinafter, a Hydrogen Generation Apparatus in Embodiment 1 according to the present invention will be described.

The hydrogen generation apparatus in this embodiment is an apparatus for generating hydrogen-containing gas using a hydrocarbon-based raw material containing a sulfur component. In order to remove the sulfur component from the raw material, an adsorbing desulfurization section for adsorbing the sulfur component is used. The adsorbing desulfurization section is detachably held in a holding mechanism provided in the hydrogen generation apparatus. When the adsorbing ability on the sulfur component is decreased, the adsorbing desulfurization section is exchanged to a new adsorbing desulfurization section, or only the adsorbing agent (adsorbing desulfurization agent) in the adsorbing desulfurization section is exchanged. Alternatively, the adsorbing desulfurization section may be regenerated. It is preferable that the adsorbing desulfurization section contains an adsorbing agent containing zeolite as a main component. A zeolite-based adsorbing agent allows desulfurization to be done at room temperature, is easy to be handled, and is easy to be exchanged and regenerated.

The hydrogen generation apparatus also includes a water supply unit for supplying water from the outside of the hydrogen generation apparatus, a reforming section (hereinafter, also referred to as the "steam reforming section") for generating hydrogen-containing gas by a reforming reaction of the raw material which has passed the adsorbing desulfurization section and water supplied from the water supply unit, a raw material supply unit for controlling the flow rate M of the raw material supplied from an element external to the apparatus, and a controller. When the exchange or regeneration of the adsorbing desulfurization section is detected, the controller controls the operation of the raw material supply unit to make the raw material flow rate M higher than the flow rate $M_0$ before the exchange or regeneration. When the accumulated flow rate reaches a preset amount after the exchange or regeneration of the adsorbing desulfurization section, the controller controls the operation of the raw material supply unit to return the increased raw material flow rate M to the flow rate $M_0$ before the exchange or regeneration.

In this embodiment, the hydrogen generation apparatus is structured such that all the raw material supplied from an external element to the hydrogen generation apparatus passes the adsorbing desulfurization section. Accordingly, the flow rate M of the raw material supplied from an external element is equal to the flow rate m of the raw material supplied to the adsorbing desulfurization section (i.e., passing a portion upstream with respect to the adsorbing desulfurization section) (M=m).

In the case where the hydrogen generation apparatus according to the present invention is used in a fuel cell power generation system, the raw material flow rate before the exchange or regeneration (normal state raw material flow rate) $M_0$ is equal to the raw material flow rate $m_0$ supplied to the adsorbing desulfurization section and is appropriately set in accordance with the target value for the power generation. For example, when the target value for the power generation is 1 kW (also referred to simply as "for power generation of 1 kW"), the raw material flow rate necessary to obtain an output of 1 kW is set to, for example, $M_0=m_0=4$ NL/min. (0° C.; converted into the value at 1 atmospheric pressure).

According to the above-described hydrogen generation apparatus, during a certain time period after the adsorbing desulfurization section is exchanged or regenerated, namely, while the adsorbing desulfurization section adsorbs a non-ignorable amount of hydrocarbon component in addition to the sulfur component, the raw material flow rate M is made higher than the raw material flow rate (normal state raw material flow rate) $M_0$ before the adsorbing desulfurization section is exchanged or regenerated. Therefore, even after the adsorbing desulfurization section is exchanged or regenerated, a necessary amount of hydrocarbon component to obtain the set generation amount (target value) of hydrogen-containing gas can be stably supplied to the reformer. Meanwhile, the increased raw material flow rate M is controlled to be returned to the normal state raw material flow rate $M_0$ when the accumulated flow rate of the raw material supplied to the adsorbing desulfurization section reaches a preset amount. Owing to this, a necessary amount of hydrogen-containing gas can be efficiently generated.

It is preferable that the "preset amount" is set based on the distribution amount necessary to saturate the adsorbing amount of the hydrocarbon component (adsorption saturation distribution amount). The adsorption saturation distribution amount varies in accordance with the type or amount of the adsorbing agent contained in the adsorbing desulfurization section. Thus, the adsorption saturation distribution amount can be found by the measurement result of the adsorbing ratio of the adsorbing desulfurization section to be used on the hydrocarbon component. The adsorbing ratio on the hydrocarbon component may be obtained by measuring the relationship between the distribution amount of the raw material through the adsorbing desulfurization section and the ratio of the exit-side flow rate with respect to the entrance-side flow rate (flow rate ratio) by substantially the same method as described above.

The ratio at which the raw material flow rate M to be supplied from an external element to the hydrogen generation apparatus (namely, the raw material flow rate m supplied to the hydrogen generation apparatus) is to be increased during the driving after the exchange or regeneration of the adsorbing desulfurization section may be determined based on the adsorbing ratio of the adsorbing desulfurization section on the hydrocarbon component. Herein, the "ratio at which the raw material flow rate M is to be increased" is the ratio of the increasing amount of the raw material flow rate M with respect to the raw material flow rate supplied to the adsorbing desulfurization section in the normal state (normal state raw material flow rate) $M_0$. Owing to this, the raw material flow rate M can be corrected more precisely in accordance with the amount of the hydrocarbon component adsorbed by the adsorbing desulfurization section. Accordingly, when such a hydrogen generation apparatus is applied to a fuel cell power generation system, the following can be effectively prevented: the generation amount of the hydrogen-containing gas is too small for the target value for the power generation, and thus the target amount of power cannot be generated; or the generation amount of the hydrogen-containing gas is too large, and hydrogen of an amount larger than necessary to generate the target amount of power is consumed, as a result of which the driving is done under conditions of a low energy efficiency.

The ratio at which the raw material flow rate M is to be increased may be varied in accordance with the accumulated flow rate of the raw material which has passed the adsorbing desulfurization section. In this case, as the accumulated flow rate of the raw material approaches the adsorption saturation distribution amount, the ratio is decreased. The relationship between the accumulated flow rate and the ratio may be organized in the form of a table based on the measurement results of the adsorbing ratio of the adsorbing desulfurization section to be used on the hydrocarbon component and input to the controller of the hydrogen generation apparatus in advance.

The hydrogen generation apparatus in this embodiment also provides the following advantages. In the case where the hydrogen generation apparatus in this embodiment is applied to a fuel cell power generation system and hydrogen off-gas is used as the heating source of the hydrogen generation apparatus, an amount of hydrogen gas suitable to the target value for the power generation can be supplied from the hydrogen generation apparatus to the fuel cell even after the adsorbing desulfurization section is exchanged or regenerated. As a result, a sufficient amount of hydrogen off-gas is supplied from the fuel cell to the combustor of the hydrogen generation apparatus. Therefore, an amount of heat necessary for the reforming reaction can be obtained with certainty and the hydrogen generation apparatus can be operated stably. In the case where the hydrogen-containing gas generated by the hydrogen generation apparatus is used as the heating source for starting the hydrogen generation apparatus, the starting time period is prevented from being extended due to the delay in the vaporization of water. The reason for this that because a sufficient amount of hydrogen-containing gas can be supplied to the combustor even after the adsorbing desulfurization section is exchanged or regenerated, an amount of heat necessary to vaporize water used for the reforming reaction can be obtained with certainty. In addition, the increase of the steam-to-carbon ratio due to the adsorption of the hydrocarbon component by the adsorbing desulfurization section can be suppressed, and the steam-to-carbon ratio can be kept substantially constant. For this reason, the dew point of the hydrogen-containing gas supplied from the hydrogen generation apparatus to the fuel cell can be suppressed from rising, and so the decrease of the power generation output of the fuel cell due to the rise of the gas dew point can be suppressed.

A method for driving a hydrogen generation apparatus in a preferable embodiment according to the present invention is characterized in introducing the raw material to the adsorbing desulfurization section at a flow rate m corrected based on the adsorbing ratio of the adsorbing desulfurization section on the hydrocarbon component. Owing to this, the increase of the steam-to-carbon ratio and the decrease of the generation amount of the hydrogen-containing gas, which would be otherwise caused due to the adsorption of the adsorbing desulfurization section on the hydrocarbon component, are suppressed. Thus, the fuel cell reformer can be driven more stably.

Hereinafter, an embodiment of the present invention will be described more specifically with reference to the figures.

Structure of a Hydrogen Generation Apparatus

Figure 3:
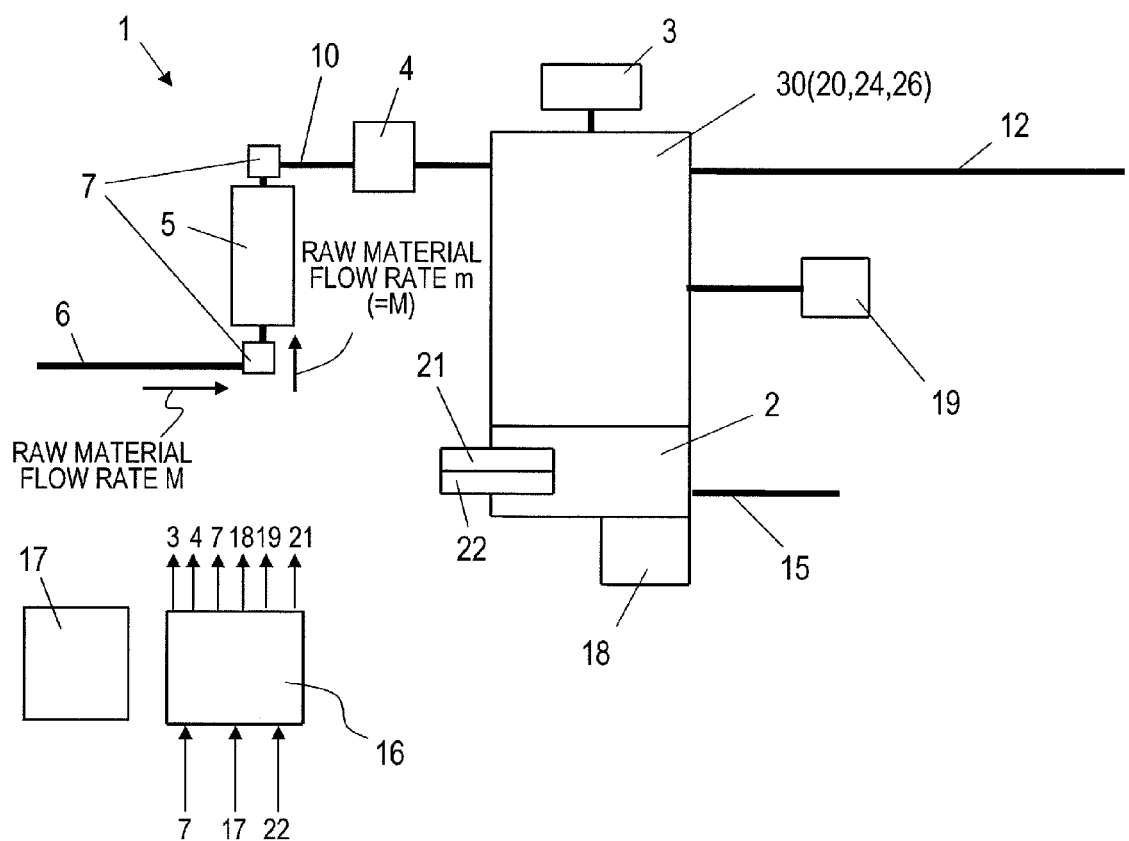
FIG. 3 is a structural view of a hydrogen generation apparatus in Embodiment 1 according to the present invention.

FIG. 3 is a structural view of a hydrogen generation apparatus in Embodiment 1 according to the present invention. A hydrogen generation apparatus 1 includes a water supply unit 3 for supplying water to the hydrogen generation apparatus 1, an adsorbing desulfurization section (odorizing component removing section) 5 for passing a hydrocarbon-based raw material containing a sulfur component as an odorizing component and adsorbing the sulfur component contained in the raw material, a reformer 30 for generating hydrogen-containing gas using the raw material which has passed the adsorbing desulfurization section 5 and water supplied from the water supply unit 3, a raw material supply unit (raw material supply section) 4 for controlling a flow rate M of the raw material (raw material flow rate) to be supplied to the adsorbing desulfurization section 5, and a controller (also referred to as the "driving control section") for controlling operations of the raw material supply unit 4 and the water supply unit 3. The reformer 30 in this embodiment includes a steam reforming section 20 for progressing a reforming reaction of the raw material and steam, a shift converting section 24 for causing a shift reaction of carbon monoxide and steam in the hydrogen-containing gas generated by the steam reforming section 20 to reduce the carbon monoxide concentration in the hydrogen-containing gas, an air supply unit 19 for supplying air to the hydrogen-containing gas which has passed the shift converting section 24, and a selective oxidation section 26 for oxidizing mainly carbon monoxide remaining in the hydrogen-containing gas which has passed the shift converting section 24 using the air supplied from the air supply section 19. The structures of the steam reforming section 20, the shift converting section 24 and the selective oxidation section 26 are substantially the same as general structures thereof, and detailed descriptions thereof will be omitted.

The hydrogen generation apparatus 1 also includes a heating section for supplying reactive heat necessary for the reforming reaction in the steam reforming section 20. The heating section includes a combustor (also referred to as the "combustion section") 2 such as a burner or the like for combusting combustion gas acting as a heating source, an igniter 21 acting as an ignition source of the combustor 2, a frame rod 22 for detecting a combustion state of the combustor 2, and a combustion fan (combustion air supply unit) 18 for supplying air to be used as fuel to the combustor 2. The combustion gas to be combusted in the combustor 2 is supplied to the combustor 2 via a combustion gas supply path 15. The hydrogen-containing gas generated by the hydrogen generation apparatus 1 is supplied to the outside of the apparatus (for example, a fuel cell) via a hydrogen gas supply path 12.

The hydrocarbon-based raw material to be supplied to the adsorbing desulfurization section 5 may be any raw material containing an organic compound formed at least of carbon and hydrogen, such as hydrocarbon or the like, and is, for example, city gas, natural gas, LPG or the like containing methane as a main component. Herein, the gas infrastructure line 6 of the city gas is used as a supply source of the raw material, and the adsorbing desulfurization section 5 is connected to the gas infrastructure line 6. The adsorbing desulfurization section 5 has a shape detachable from connection sections 7 which are provided upstream and downstream with respect to the adsorbing desulfurization section 5. When the adsorbing amount of the sulfur component by the adsorbing desulfurization section 5 is saturated as a result of using the adsorbing desulfurization section 5 for a certain time period and so the adsorbing characteristic thereof is declined, the adsorbing desulfurization section 5 is detached from the hydrogen generation apparatus 1 and a new adsorbing desulfurization section or a regenerated adsorbing desulfurization section is installed instead. The adsorbing desulfurization section 5 in this embodiment is filled with a zeolite-based adsorbing agent for adsorbing a sulfur compound, which is an odorizing component in the city gas.

The water supply unit 3 in this embodiment includes a pump having a flow rate adjusting function. The raw material supply unit 4 is located on a raw material supply path 10 for connecting the adsorbing desulfurization section 5 and the reformer 30 to each other, and controls the flow rate of the raw material to be supplied to the reformer 30 to control the flow rate of the raw material to be supplied from the gas infrastructure line 6 to the adsorbing desulfurization section 5. The raw material supply unit 4 only needs to be able to control the flow rate of the raw material to be supplied to the adsorbing desulfurization section 5, and may be located downstream with respect to the raw material supply unit 4. In this embodiment, the raw material supply unit 4 includes a booster pump, and, for example, can control the electric current pulse to be input, power to be input or the like to adjust the flow rate of the raw material to be supplied to the adsorbing desulfurization section 5.

The controller 16 is a control section for controlling a driving operation on the hydrogen-containing gas in the hydrogen generation apparatus 1. Herein, the controller 16 controls the amount of the raw material to be supplied from the raw material supply unit 4 to the reformer 30, the amount of water to be supplied from the water supply unit 3 to the reformer 30, and the like. The controller 16, using a semiconductor memory, a CPU or the like, can store the driving information and the like such as a driving operation sequence of the hydrogen generation apparatus 1, the accumulated raw material flow rate and the like, calculate an appropriate operation condition suitable to the situation, and issue an instruction on the operation condition to elements necessary for the driving such as the water supply unit 3, the raw material supply unit 4 and the like. The controller 16 is connected to an input section (also referred to the "exchange/regeneration information acquisition unit") 17 for inputting a driving instruction signal to the hydrogen generation apparatus 1, an exchange/regeneration signal regarding the adsorbing desulfurization section 5 (such a signal will also be referred to as the "odorizing component removing member exchange/regeneration information") and the like. A conventional system uses an input section for inputting a driving instruction signal, but the input section 17 in this embodiment is usable to input an exchange/regeneration signal in addition to the driving instruction signal, unlike the input section in the conventional system. For example, the input section 17 includes a touch panel, and a maintenance worker or a user may input a driving instruction signal or an exchange/regeneration signal from the touch panel when necessary.

Although not shown, the hydrogen generation apparatus 1 may further include an exchange/regeneration signal output section for outputting an exchange/regeneration signal regarding the adsorbing desulfurization section 5 to the control signal 16. The exchange/regeneration signal may be output based on, for example, a signal which is input to the input section 17 by the maintenance worker of the hydrogen generation apparatus 1. Alternatively, a mechanism for holding the adsorbing desulfurization section 5 (for example, the connection sections 7) may be provided with a desulfurization section exchange detection section (a contact switch, a sensor, etc.) for detecting an exchange of the adsorbing desulfurization section 5. When the desulfurization section exchange detection section detects an exchange, an exchange/regeneration signal may be generated in the exchange/regeneration signal output section and output to the controller 16. In this case, the desulfurization section exchange detection section acts as the "exchange/regeneration information acquisition unit".

<Operation of the Hydrogen Generation Apparatus in a Normal State>

Now, a driving operation on the hydrogen generation apparatus 1 during the normal driving will be described.

Before starting the hydrogen generation apparatus 1 from a stop state, first, valves and the like (the details are not shown) set on gas flow paths of the hydrogen generation apparatus 1 are closed where necessary to check whether there is a gas leak from each gas flow path or the like. When there is no gas leak, the hydrogen generation apparatus 1 is started. Based on an instruction from the controller 16, the raw material which has passed the reformer is supplied to the combustor 2 and ignited by the combustor 2 to start heating of the steam reforming section 20.

At this point, the water supply unit 3 is operated to supply water to the reformer 30 and thus to start a reforming reaction of water and the raw material. In this embodiment, city gas (13A) containing methane as a main component is used as the raw material. The amount of water supplied from the water supply unit 3 is controlled such that the amount of steam is about 3 mols with respect to 1 mol of the carbon atoms in the average molecules of the city gas (steam-to-carbon ratio (S/C): about 3). In the reformer 30, the steam reforming section 20 progresses a steam reforming reaction, the shift converting section 24 progresses a shift reaction, and the selective oxidation section 26 progresses a selective oxidation reaction of carbon monoxide. The generated hydrogen-containing gas is supplied to an external device (for example, a fuel cell) via the hydrogen gas supply path 12. It is preferable to reduce the concentration of carbon monoxide in response to a request from the external device to which the hydrogen-containing gas is to be supplied. For example, in the case where the hydrogen-containing gas is to be supplied to a solid-state polymer-type fuel cell, the concentration of carbon monoxide is reduced to about 20 ppm or lower on the volume basis (on the dry gas basis). The controller 16 also controls the operation of the raw material supply unit 4 such that the raw material is adjusted to be supplied to the adsorbing desulfurization section 5 in a preset flow rate with respect to the amount of the hydrogen-containing gas required by the external device to which the raw material is to be supplied.

By contrast, for stopping the driving of the hydrogen generation apparatus 1, the supply of the raw material and water to the reformer 30 is stopped, and the temperature of a catalyst layer of each of the steam reforming section 20, the shift converting section 24 and the selective oxidation section 26 in the reformer 30 is lowered. After the temperature of each catalyst layer is lowered to a set temperature, the raw material is supplied to the reformer 30 to replace the hydrogen-containing gas staying inside the gas path of the reformer 30 with the raw material. The hydrogen-containing gas staying inside the reformer 30 and replaced at this point is passed to the combustor 2 and combusted.

Usable as the combustion gas to be combusted in the combustor 2 is the raw material supplied from the gas infrastructure line 6, the hydrogen-containing gas generated in the reformer 30, the hydrogen-containing gas supplied from the hydrogen generation apparatus 1 to the external device but not used in the external device (for example, hydrogen off-gas discharged from an anode of the fuel cell, among the hydrogen-containing gas supplied to the fuel cell), or the like. Such combustion gas is each sent to the combustor 2 via the combustion gas path 15.

<Operation of the Hydrogen Generation Apparatus Immediately After an Exchange of the Adsorbing Desulfurization Section>

Now, a method for driving the hydrogen generation apparatus 1 after the adsorbing desulfurization section 5 is exchanged will be described.

As described above, the adsorbing agent used in the adsorbing desulfurization section 5 adsorbs a hydrocarbon component in the raw material in addition to the sulfur compound. Especially, the zeolite-based adsorbing agent used in this embodiment has a great tendency to adsorb the hydrocarbon component, and adsorbs a large amount of the raw material in the state where the raw material starts passing the adsorbing desulfurization section (initial distribution period of the raw material). Therefore, where the adsorbing desulfurization section 5 which has been passed by almost no raw material (new adsorbing desulfurization section) 5 is connected to the connection sections 7, a part of the hydrocarbon component in the raw material is adsorbed in the adsorbing desulfurization section 5 during the immediately subsequent driving. Where the hydrogen generation apparatus is driven in such a state, the amount of the hydrogen-containing gas generated in the reformer 30 is too small to supply a necessary amount of hydrogen gas to the external device as the supply destination. In the case where the hydrogen off-gas, from the external device to which the hydrogen-containing gas was supplied, is used as a heating source of the hydrogen generation apparatus 1, the amount of heat necessary for the reforming reaction is not obtained. Thus, it becomes difficult to continue the normal driving of the hydrogen generation apparatus 1. In the case where the amount of water supplied from the water supply unit 3 is constant, the steam-to-carbon ratio is deviated due to the adsorption of the hydrocarbon component. Especially for starting the hydrogen generation apparatus 1, there is an undesirable possibility that the amount of heat necessary for vaporizing water may not be supplied. There also occurs a problem that as a result of the vaporization of water being delayed, the time necessary to start the apparatus is extended. In addition, the dew point of the hydrogen-containing gas supplied from the hydrogen generation apparatus 1 is changed. Therefore, for example, when the hydrogen-containing gas generated by the hydrogen generation apparatus 1 is supplied to a fuel cell, there is an undesirable possibility that necessary power is not obtained.

In order to avoid this, in this embodiment, when an exchange of the adsorbing desulfurization section 5 is detected, the operation of the raw material supply unit 4 is controlled such that the flow rate M of the raw material to be supplied to the hydrogen generation apparatus 1 from the gas infrastructure line 6 is made higher than the raw material flow rate $M_0$ before the adsorbing desulfurization section 5 is exchanged or regenerated. Owing to this, the flow rate m of the raw material to be supplied to the adsorbing desulfurization section 5 can be made higher than the raw material flow rate $m_0$ before the adsorbing desulfurization section 5 is exchanged.

This will be described specifically. First, for exchanging the adsorbing desulfurization section 5, the maintenance worker or the like inputs an exchange/regeneration signal through the input section 17. The input exchange/regeneration signal is sent to the controller 16. Upon receiving the exchange/regeneration signal, the controller 16 controls the operation of the raw material supply unit 4 to increase the raw material flow rate M. As a result, after the adsorbing desulfurization section 5 is exchanged, a sufficient flow rate of the raw material can be passed through the adsorbing desulfurization section 5 and supplied to the reformer 30 with certainty, and a sufficient amount of hydrogen-containing gas can be generated. Since the deviation of the steam-to-carbon ratio is corrected, the above-described problems can be alleviated. In addition, the dew point of the hydrogen-containing gas supplied from the hydrogen generation apparatus 1 can be stabilized.

In this embodiment, the amount by which the raw material is to be increased after the adsorbing desulfurization section 5 is exchanged (increasing amount) is set as follows. The adsorbing characteristic of the adsorbing desulfurization section 5 is obtained by the measurement as described above with reference to FIG. 1, and the increasing amount is set such that the amount of the raw material which is decreased by the raw material passing the adsorbing desulfurization section 5 is compensated for. Hereinafter, this will be specifically described with an example in which the hydrogen generation apparatus 1 in this embodiment is applied to a fuel cell power generation system.

It is assumed that the adsorbing desulfurization section 5 during the driving before the exchange (during the normal driving), namely, the adsorbing desulfurization section 5 which adsorbs almost no hydrocarbon component in the raw material, is connected to the connection sections 7. In this case, where the target value for the power generation by the fuel cell is 1 kW, the flow rate $m_0$ (=$M_0$) of the raw material to be supplied to the adsorbing desulfurization section 5 is set in accordance with the target value for the power generation. For example, the flow rate $m_0$ is 4 NL/min. At the point when, after the adsorbing desulfurization section 5 is exchanged, about 240 L of the raw material has passed the new adsorbing desulfurization section 5 (accumulated flow rate: about 240 L), it is necessary, based on the above-described measurement results, to increase the raw material flow rate by about 10% in order to obtain the hydrogen-containing gas required to generate 1 kW of power. Therefore, the flow rate m (=M) of the raw material to be supplied to the adsorbing desulfurization section 5 is set to be 4.4 NL/min. In this example, the raw material flow rate m when the accumulated flow rate is about 240 L is described. Similarly, the value of the raw material flow rate m with respect to the target value for the power generation immediately after the adsorbing desulfurization section 5 is exchanged, or when the accumulated flow rate m is different from about 240 L, can also be appropriately set based on the measurement results of the amount of the raw material adsorbed in the adsorbing desulfurization section 5.

In this embodiment, there is no specific limitation on the zeolite-based adsorbing agent contained in the adsorbing desulfurization section 5, but the adsorbing characteristic on the hydrocarbon component in the raw material varies in accordance with the type of the zeolite-based adsorbing agent. Thus, when the adsorbing desulfurization section 5 with a different type of zeolite-based adsorbing agent is to be used, it is preferable to measure the adsorbing characteristic of the adsorbing desulfurization section 5 on the hydrocarbon component in advance by, for example, substantially the same method as described above and control the raw material flow rate m based on the obtained adsorbing characteristic. It is advantageous to set the driving condition of the hydrogen generation apparatus 1 after the adsorbing desulfurization section 5 is exchanged for each adsorbing agent to be used, because in this way, the amount of the hydrocarbon component adsorbed by the adsorbing agent can be compensated for with more certainty.

After the adsorbing desulfurization section 5 is exchanged, it is desirable that the amount by which the flow rate m of the raw material to be supplied to the adsorbing desulfurization section 5 is to be increased, namely, the amount by which the flow rate M of the raw material to be supplied from an external element is to be increased, is an amount which completely compensates for the hydrocarbon component adsorbed in the adsorbing desulfurization section 5. However, the amount to be increased may be smaller than the amount which completely compensates for the adsorbed hydrocarbon component. An amount of the generated hydrogen-containing gas slightly deviated from the set value is acceptable as long as the deviation is within a range in which the hydrogen generation apparatus 1 or the unit at the supply destination of the hydrogen-containing gas (fuel cell, etc.) can be driven stably. The amount by which the raw material flow rate M is to be increased may be determined within such a range.

In general, when an adsorbing agent adsorbs a certain amount of substance, the adsorbing amount is saturated. As shown in FIG. 1, the adsorbing agent used in this embodiment shows substantially the same tendency. Therefore, the amount of the hydrocarbon component adsorbed by the adsorbing agent is gradually saturated by passing a certain amount of the raw material through the adsorbing agent. As a result, the shortage of the flow rate of the raw material which has passed the adsorbing desulfurization section 5 can be solved. Namely, when the raw material is flown to the adsorbing desulfurization section 5 for a certain time period by driving the hydrogen generation apparatus 1 after the adsorbing desulfurization section 5 is exchanged, the amount of the hydrocarbon component adsorbed by the adsorbing desulfurization section 5 is decreased and so the flow rate of the raw material which has passed the adsorbing desulfurization section 5 is stabilized.

Accordingly, it is preferable that after the flow rate of the raw material which has passed the adsorbing desulfurization section 5 is stabilized, the raw material flow rate M is returned to the pre-exchange raw material flow rate (normal state raw material flow rate) $M_0$. The timing for returning the raw material flow rate M to the normal state raw material flow rate $M_0$ may be determined based on, for example, the accumulated flow rate of the raw material supplied to the adsorbing desulfurization section 5. The raw material flow rate may be returned to the normal state raw material flow rate in one step, or may be returned step by step. For example, several target points may be set for the accumulated raw material flow rate, and each time such a target point is reached, the raw material flow rate M may be decreased at a prescribed ratio. Alternatively, the relationship between the accumulated raw material flow rate and the adsorbing amount in the adsorbing desulfurization section 5 may be put into a function and the raw material flow rate may be decreased in accordance with the function.

Although not shown, the accumulated flow rate of the raw material to be supplied to the adsorbing desulfurization section 5 is measured by, for example, an accumulated flow rate measuring section including a dry- or wet-type accumulated flow meter. Preferably, the controller 16 operates as follows. When an exchange of the adsorbing desulfurization section 5 is detected, the controller 16 controls an operation of the accumulated flow rate measuring section to start a measurement of the accumulated flow rate. When the measured accumulated flow rate reaches a preset value, the controller 16 controls the raw material supply unit 4 to return the raw material flow rate M to the raw material flow rate $M_0$ in the normal state. The accumulated flow rate measuring section may be structured to calculate an accumulated flow rate based on the raw material flow rate M (=m) and the driving time period. The accumulated flow rate may be directly measured using a flow meter or estimated from an operation indication value (input power or input frequency) of the raw material supply unit 4. In the case where the hydrogen generation apparatus 1 is applied to a fuel cell power generation system, the accumulated flow rate measuring section may be structured to calculate an accumulated raw material flow rate based on the amount of the accumulated power generated by the fuel cell.

Application to a Fuel Cell Power Generation System

Figure 4:
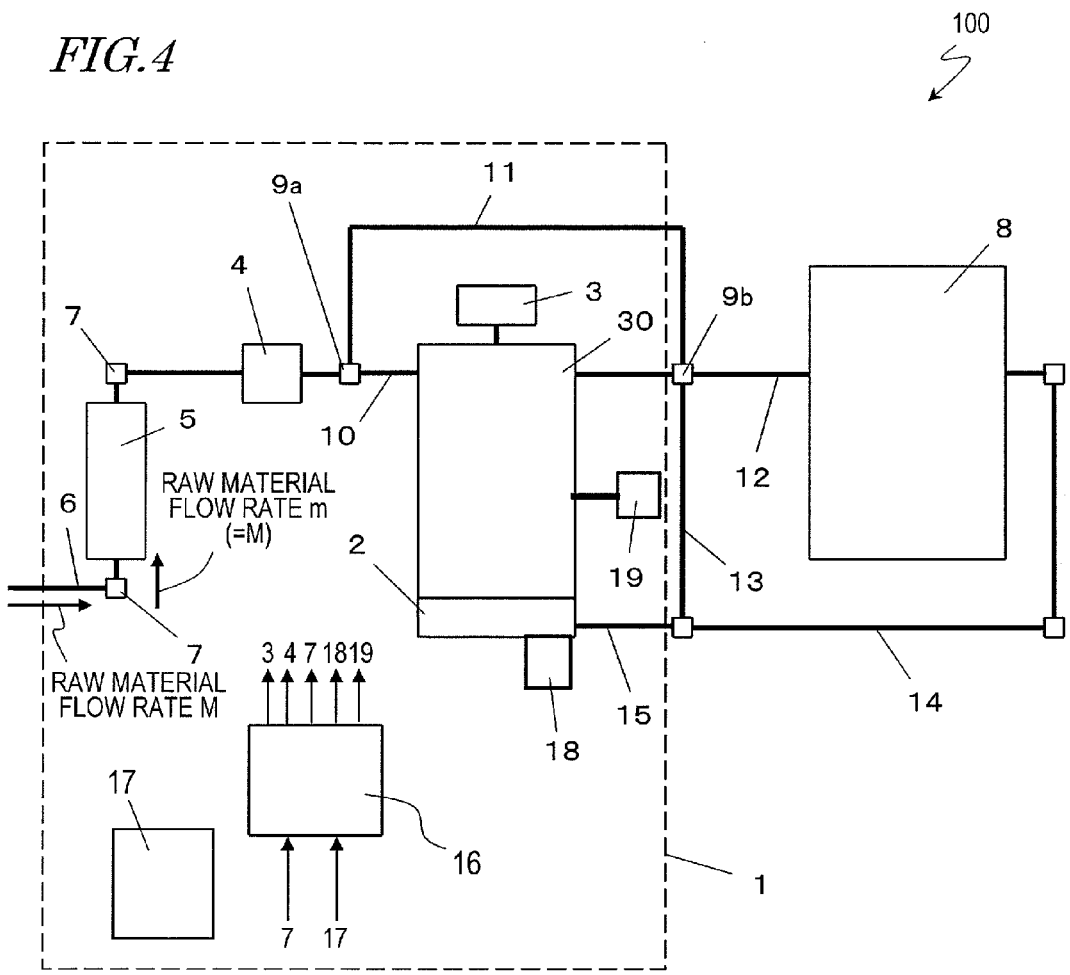
FIG. 4 is a structural view of a fuel cell power generation system using the hydrogen generation apparatus in Embodiment 1 according to the present invention.

The hydrogen generation apparatus 1 in this embodiment is preferably usable in a fuel cell power generation system. FIG. 4 is a schematic view of a fuel cell power generation system using the hydrogen generation apparatus 1 in this embodiment. For simplicity, substantially the same elements as those of FIG. 3 bear the same reference numerals therewith and descriptions thereof will be omitted.

The fuel cell power generation system 100 includes the hydrogen generation apparatus 1, a fuel cell 8 for performing power generation using the hydrogen-containing gas supplied from the hydrogen generation apparatus 1, the hydrogen gas supply path 12 for supplying hydrogen gas from the hydrogen generation apparatus 1 to the fuel cell 8, and an off-gas path 14 for supplying hydrogen off-gas discharged from the fuel cell 8 to the combustor 2 of the hydrogen generation apparatus 1. A gas switch section 9a is provided on the raw material supply path 10, and is connected to a reformer bypass path 11. A gas switch section 9b is provided on the hydrogen gas supply path 12, and is connected to the reformer bypass path 11 and a fuel cell bypass path 13.

The fuel cell power generation system 100 operates as follows. While the hydrogen generation apparatus 1 is being started (starting time period), the gas switch section 9b is operated to supply the hydrogen-containing gas generated in the hydrogen generation apparatus 1 from the hydrogen gas supply path 12 to the combustor 2 via the fuel cell bypass path 13 and the combustion gas supply path 15. After the hydrogen generation apparatus 1 is started, the hydrogen off-gas discharged from the fuel cell 8 is supplied from the off-gas path 14 to the combustor 2 of the hydrogen generation apparatus 1 via the combustion gas supply path 15. The fuel cell power generation system 100 is structured such that in the case where the raw material which has not been supplied yet to the reformer 30 needs to be combusted by the combustor 2, the raw material which has passed the adsorbing desulfurization section 5 can be supplied to the combustor 2 or the fuel cell 8 using the reformer bypass path 11 without passing the raw material through the reformer 30. Accordingly, when necessary, it is possible to, during the power generation by the combustor 2, send a part of the raw material which has passed the adsorbing desulfurization section 5 from the gas switch section 9a directly to the combustion gas path 15 and combust the part of the raw material in the combustion section 2 together with the hydrogen off-gas (assist combustion).

With the fuel cell power generation system 100, it is preferable that during the normal driving, the raw material flow rate (normal state raw material flow rate) $m_0$ of the raw material to be supplied to the adsorbing desulfurization section 5 is preset in accordance with the target value for the power generation by the fuel cell 8. Specifically, it is preferable that the raw material flow rate $m_0$ is preset in the controller 16 for each target value for the power generation. For example, a table showing that the raw material flow rate $m_0$ for power generation of 1 kW is 4 NL/min., the raw material flow rate $m_0$ for power generation of 750 W is 3.1 NL/min., etc. can be set in the controller 16. The normal state raw material flow rate $m_0$ may be changed in correspondence with the change of the target value for the power generation in conformity with a predefined program. After the adsorbing desulfurization section 5 is exchanged, the raw material flow rate m is increased based on the normal state raw material flow rate $m_0$. It is preferable that the amount to be increased is determined in consideration of the adsorbing ratio of the adsorbing desulfurization section 5 on the hydrocarbon component. It is also preferable that the amount to be increased is set based on the raw material flow rate $m_0$ provided in consideration of the amount of the hydrogen-containing gas which can be generated from the composition of the raw material.

As described above, where the hydrogen generation apparatus 1 is used, the hydrogen-containing gas can be stably supplied to the fuel cell 8 in an amount required by the fuel cell 8 regardless of the adsorbing ratio of the adsorbing desulfurization section 5 on the hydrocarbon component. Therefore, the output of the fuel cell 8 can be prevented from being decreased and so the fuel cell power generation system 100 can be stably driven.

Figure 5:
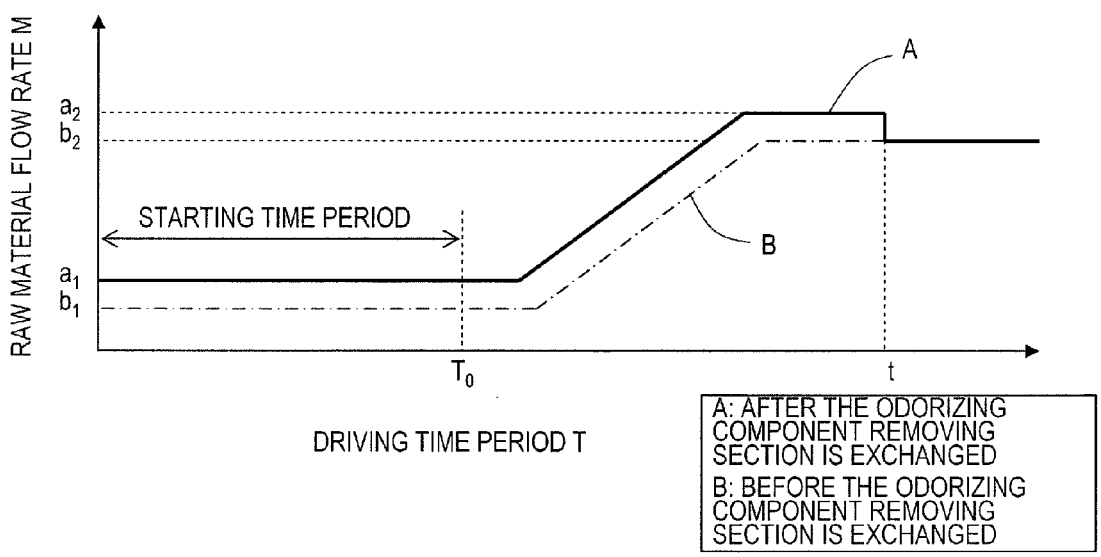
FIG. 5 is a schematic view of a control pattern on a raw material flow rate according to the present invention.

FIG. 5 is a graph showing an example of a control pattern on the raw material flow rate M (=m) in the fuel cell power generation system 100 shown in FIG. 4. The horizontal axis shows the time from when the system starts to be driven (driving time period) T, and the vertical axis shows the raw material flow rate. In FIG. 5, one-dot chain line B shows the time-wise change of the raw material flow rate $M_0$ when the system starts to be driven before the adsorbing desulfurization section 5 is exchanged, namely, in the state where the adsorbing desulfurization section 5 which has been passed by the raw material of the adsorption saturation distribution amount or larger is installed. Solid line A shows the time-wise change of the raw material flow rate M when the system starts to be driven for the first time after the adsorbing desulfurization section 5 is exchanged.

Before the adsorbing desulfurization section is exchanged (in the normal state), as represented by the one-dot chain line B, during a time period after the driving is started until a prescribed power (for example, 300 W) is output ($0 \leq T < T_o$; hereinafter, referred to as the "starting time period"), the raw material flow rate is suppressed to b1 in order to adjust the temperature rise of the hydrogen generation apparatus. When the prescribed power is output ($T \geq T_o$), the raw material flow rate is increased to b2, which is necessary to obtain the target value for the power generation (for example, 1 kW). With the one-dot chain line B, the raw material flow rates during the starting time period and after the starting are generally constant at b1 and b2, respectively. In actuality, the raw material flow rates may occasionally not constant because more complicated control is executed.

By contrast, during the driving immediately after the adsorbing desulfurization section 5 is exchanged, as understood from the solid line A, during a certain time period after the system starts to be driven ($0 \leq T \leq t$), raw material flow rates a1 and a2 are controlled to be higher than the normal state raw material flow rates b1 and b2 represented by the one-dot chain line B (a1>b0; a2>b2). After the certain time period, the raw material flow rates are returned to the normal state raw material flow rates. In this example, the raw material flow rate is decreased to the normal state raw material flow rate in one step when the driving time period T=t, but may be decreased step by step.

As described above, in the normal state, the raw material flow rate $M_0$ is controlled in accordance with the target value for the power generation, the driving time period T and the like. After the adsorbing desulfurization section is exchanged, the raw material flow rate is temporarily increased based on the normal state raw material flow rate ($M_0$=b1, b2). As a result, after the adsorbing desulfurization section is exchanged, the ratio of the raw material flow rate M with respect to the target value for the power generation becomes higher than the ratio in the normal state. The normal state raw material flow rate $M_0$ does not need to be constant with respect to the target value for the power generation.

Figure 6:
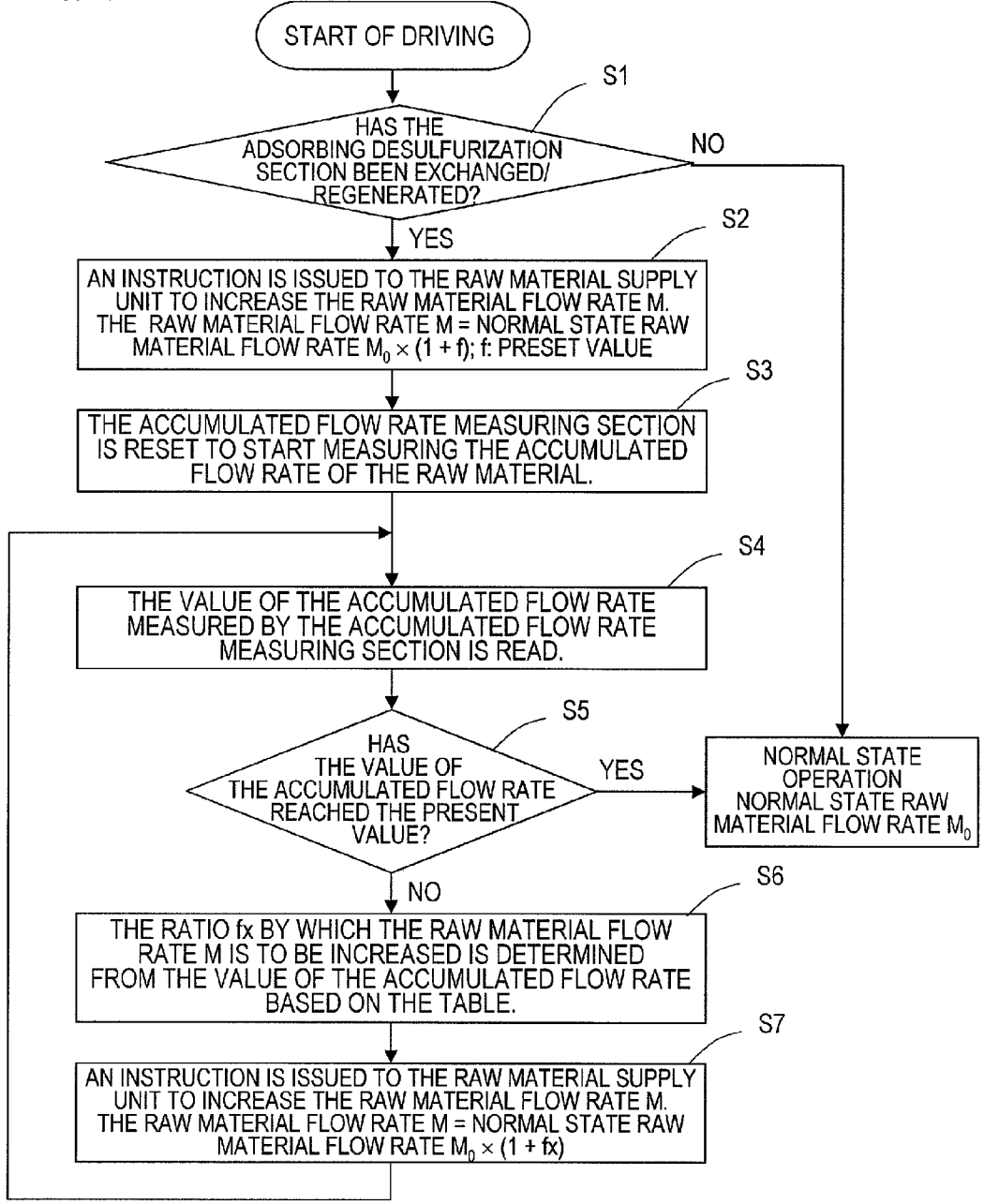
FIG. 6 is a flowchart of a control program executed by a controller in Embodiment 1 according to the present invention.

Now, a control program executed by the controller 16 will be described specifically. FIG. 6 is a flowchart showing an example of the control program 16.

Before staring the driving, the controller 16 first detects whether the adsorbing desulfurization section 5 has been exchanged or regenerated (step S1). When it is detected that the adsorbing desulfurization section 5 has been neither exchanged nor regenerated, the controller 16 executes the control for the normal state. By contrast, when it is detected that the adsorbing desulfurization section 5 has been exchanged or regenerated, the controller 16 issues an instruction to the raw material supply unit 4 to increase the raw material flow rate M at a preset ratio f (step S2). The raw material flow rate M at this point is: the raw material flow rate in the normal state (normal state raw material flow rate) $M_0 \times (1+f)$. Next, the accumulated flow rate measuring section located, for example, upstream with respect to the adsorbing desulfurization section 5 is reset to cause the adsorbing desulfurization section 5 to start measuring the accumulated flow rate of the raw material to be supplied to the adsorbing desulfurization section 5 (step S3). Step S3 may be performed before step S2 or concurrently with step S2. Next, the value of the accumulated flow rate measured by the accumulated flow rate measuring section is read (step S4). Herein, step S4 is executed, for example, every 5 minutes, and it is determined each time whether the value of the accumulated flow rate read in step S4 has reached a preset value (step S5). When the read value has not reached the preset value, the increasing amount ratio fx of the raw material flow rate M with respect to the normal state raw material flow rate $M_0$ is determined based on the read value of the accumulated flow rate (step S6), and an instruction is issued to the raw material supply unit 4 to increase the raw material flow rate M (step S7). The raw material flow rate M at this point is: the normal state raw material flow rate $M_0 \times (1+fx)$. Then, step S4 is executed again. Thus, steps S4 through S7 are repeated until it is determined in step S5 that the value of the accumulated flow rate has reached the present value. When it is determined in step S5 that the value of the accumulated flow rate has reached the present value, an instruction is issued to the raw material supply unit 4 to return the raw material flow rate to the normal state raw material flow rate $M_0$.

In the above-described control program, the value of the accumulated flow rate is read at a prescribed timing and the increasing amount ratio fx of the raw material flow rate M is updated based on the read value. Therefore, the amount of the hydrocarbon component adsorbed in the adsorbing desulfurization section 5 can be compensated for efficiently and certainly.

The hydrogen generation apparatus in this embodiment is preferably usable for a home-use fuel cell power generation system. In this case, in order to provide a part of the power consumed in the household efficiently, the amount of power generation may be varied in accordance with the time slot in a day. Hereinafter, an example of a control pattern for the power generation will be descried with reference to the figure.

Figure 7:
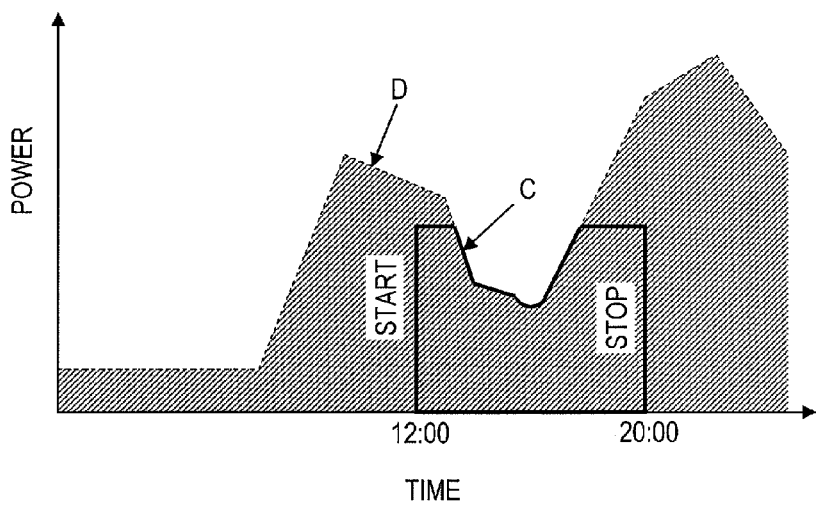
FIG. 7 is a graph showing an example of a control pattern of power generation output.

In FIG. 7, line D shows an example of a change of the power consumption of one day in a household. The horizontal axis represents the time, and the vertical axis represents the power consumption. Line C shows an example of a control pattern on the power generation output after the home-use fuel cell power generation system is started. The horizontal axis represents the time, and the vertical axis represents the power generation output. In this example, the power generation output (line C) is set to provide a part of the power to be consumed in the household efficiently.

In order to change the power generation output as represented by the line C, the raw material flow rate (normal state raw material flow rate) may be changed in accordance with the power to be output in conformity with a predefined program. In this case also, after the adsorbing desulfurization section 5 is detected to have been exchanged or regenerated, the raw material flow rate is temporarily increased based on the normal raw material flow rate which is changed based on the program. Owing to this, even immediately after the adsorbing desulfurization section 5 is exchanged, a desired power generation output can be obtained.

The hydrogen generation apparatus in this embodiment may have a mechanism for reproducing an adsorbing agent contained in the adsorbing desulfurization section 5 in the state where the adsorbing desulfurization section 5 is held in the apparatus. The adsorbing agent can be regenerated by, for example, passing gas, such as air, which does not contain a sulfur compound through the adsorbing desulfurization section 5 while heating the adsorbing desulfurization section 5. Gas which has passed the adsorbing desulfurization section 5 and contains a sulfur compound desorbed from the adsorbing agent may be discharged to the outside of the apparatus or may be used as combustion gas in the combustor 2. When the adsorbing desulfurization section 5 is regenerated, the hydrocarbon component adsorbed by the adsorbing agent is desorbed. Thus, as in the case where the adsorbing desulfurization section 5 is exchanged, the raw material flow rate is increased when the apparatus is driven after the regeneration.

In the above embodiment, an exchange or regeneration of the adsorbing desulfurization section 5 is detected by an exchange/regeneration signal input through the input section 17. The exchange of the adsorbing desulfurization section 5 can be detected by other means. For example, the connection sections 7 may be provided with a desulfurization section exchange detection section for detecting an exchange of the adsorbing desulfurization section 5 by a mechanical contact switch, or with a desulfurization section exchange detection section for detecting an exchange of the adsorbing desulfurization section 5 using an IC tag or the like.

Also, an exchange or regeneration of the adsorbing desulfurization section 5 can be detected by detecting a driving operation state of the hydrogen generation apparatus. For example, when the hydrogen generation apparatus is started immediately after the adsorbing desulfurization section 5 is exchanged or regenerated, the flow rate of the raw material sent to the combustor 2 decreases. Unless the flow rate of the raw material is corrected, the operation of igniting the raw material in the combustor 2 is destabilized, which extends the time required for the ignition operation or increases the number of times of the ignition operation because the raw material is determined not to be ignited. In addition, since the flow rate of the raw material sent to the combustor 2 decreases, the amount of heat decreases although the heat is necessary for the reforming reaction. Thus, the temperature rise in the reformer becomes slow and so the starting time period is extended. Namely, by detecting the driving operation state of the hydrogen generation apparatus, which is different from that before the exchange or regeneration of the adsorbing desulfurization section 5, the adsorbing desulfurization section 5 can be detected to have been exchanged or regenerated. In this case, the hydrogen generation apparatus 100 may be driven with the raw material being introduced to the adsorbing desulfurization section 5 at a flow rate corrected based on the adsorbing ratio of the adsorbing desulfurization section 5 on the hydrocarbon component.

An exchange or regeneration of the adsorbing desulfurization section 5 can also be detected by a maintenance signal input by the maintenance worker when he/she performs a maintenance work of the hydrogen generation apparatus or the fuel cell power generation system. The maintenance signal may include an exchange/regeneration signal (odorizing component removing member exchange/regeneration information) which indicates that the adsorbing desulfurization section 5 has been exchanged or regenerated. Alternatively, the maintenance signal may be a signal indicating that a certain type of repair work has been done on the hydrogen generation apparatus and does not need to include specific information on particulars of the repair work. The maintenance signal may indicate that an element other than the adsorbing desulfurization section 5 has been exchanged or regenerated. Even where the maintenance signal does not include the odorizing component removing member exchange/regeneration information, it can be detected whether or not the adsorbing desulfurization section has been exchange/regenerated by detecting the above-described driving operation state of the hydrogen generation apparatus together with the maintenance signal. Similarly, where an exchange/regeneration signal is mechanically input by the desulfurization section exchange detection section or the like, it may be determined whether or not the adsorbing desulfurization section 5 has been exchange/regenerated by taking the driving operation state of the hydrogen generation apparatus 1 into consideration. For example, it is assumed that in the case where the adsorbing desulfurization section 5 is once disconnected from the connection section and then the same adsorbing desulfurization section 5 is connected to the connection section, an exchange/regeneration signal is input by the contact switch. Even in this case, it can be determined based on the driving operation state of the hydrogen generation apparatus 1 that neither exchange nor regeneration has been done and the hydrogen generation apparatus 1 can be kept to be operated without increasing the raw material flow rate M.

For driving the hydrogen generation apparatus 1 in this embodiment, the raw material can be introduced to the adsorbing desulfurization section 5 at a flow rate m corrected based on the adsorbing ratio of the adsorbing agent in the adsorbing desulfurization section 5 on the hydrocarbon component. Herein, the expression that "flow rate is corrected" means that where the raw material flow rate when the adsorbing ratio is substantially zero is set as the base flow rate, the raw material flow rate m is made higher than the base flow rate when the adsorbing ratio of the adsorbing agent on the hydrocarbon component is higher than a prescribed value (for example, 1%), whereas the increasing amount of the raw material flow rate m with respect to the base amount is made zero when the adsorbing ratio becomes sufficiently low (for example, substantially zero). The "base flow rate" corresponds to the raw material flow rate $m_0$ immediately before the adsorbing desulfurization section 5 is exchanged/regenerated (the above-described normal state raw material flow rate).

The adsorbing ratio of the adsorbing agent on the hydrocarbon component is found by, for example, measuring the accumulated flow rate of the raw material supplied to the adsorbing desulfurization section 5. In this case, as described above, the relationship between the adsorbing ratio, on the hydrocarbon component, of the adsorbing desulfurization section (new or regenerated adsorbing desulfurization section) 5 to be used and the accumulated flow rate needs to be input to the hydrogen generation apparatus 1 in advance.

Alternatively, as described above, it can be determined whether or not the adsorbing ratio is higher than a preset prescribed value based on the detection results on the driving operation state of the hydrogen generation apparatus 1. When the adsorbing ratio determined based on the driving operation state is higher than the prescribed value, the raw material flow rate m is made higher than the base flow rate; whereas when the adsorbing ratio is equal to or lower than the prescribed value, the raw material flow rate m is set to the base flow rate. Finding the adsorbing ratio based on the driving operation state is advantageous because an appropriate raw material flow rate m can be determined in accordance with the adsorbing characteristic of the installed adsorbing desulfurization section 5 even in the case where, for example, the adsorbing desulfurization section 5 once removed from the hydrogen generation apparatus is set to the connection sections 7 or where the saturation-treated adsorbing desulfurization section 5 is installed, as well as in the case where the adsorbing desulfurization section 5 is exchanged or regenerated.

In this embodiment, one detachable adsorbing desulfurization section 5 is used. Alternatively, a plurality of adsorbing desulfurization sections located in series or in parallel may be used. In this case, it is sufficient that at least one of the plurality of adsorbing desulfurization sections has a detachable structure.

The adsorbing agent used in the odorizing component removing section in this embodiment is not limited to a desulfurizing agent such as a zeolite-based adsorbing agent or the like, and an appropriate agent may be selected in accordance with the type of the odorizing agent contained in the raw material gas. In the case where raw material gas containing a nitrogen-containing compound is used as the odorizing agent, an adsorbing agent for adsorbing a nitrogen-containing compound such as a zeolite-based adsorbing agent described in the embodiment, activated carbon or the like is usable, for example.

Embodiment 2

Figure 8:
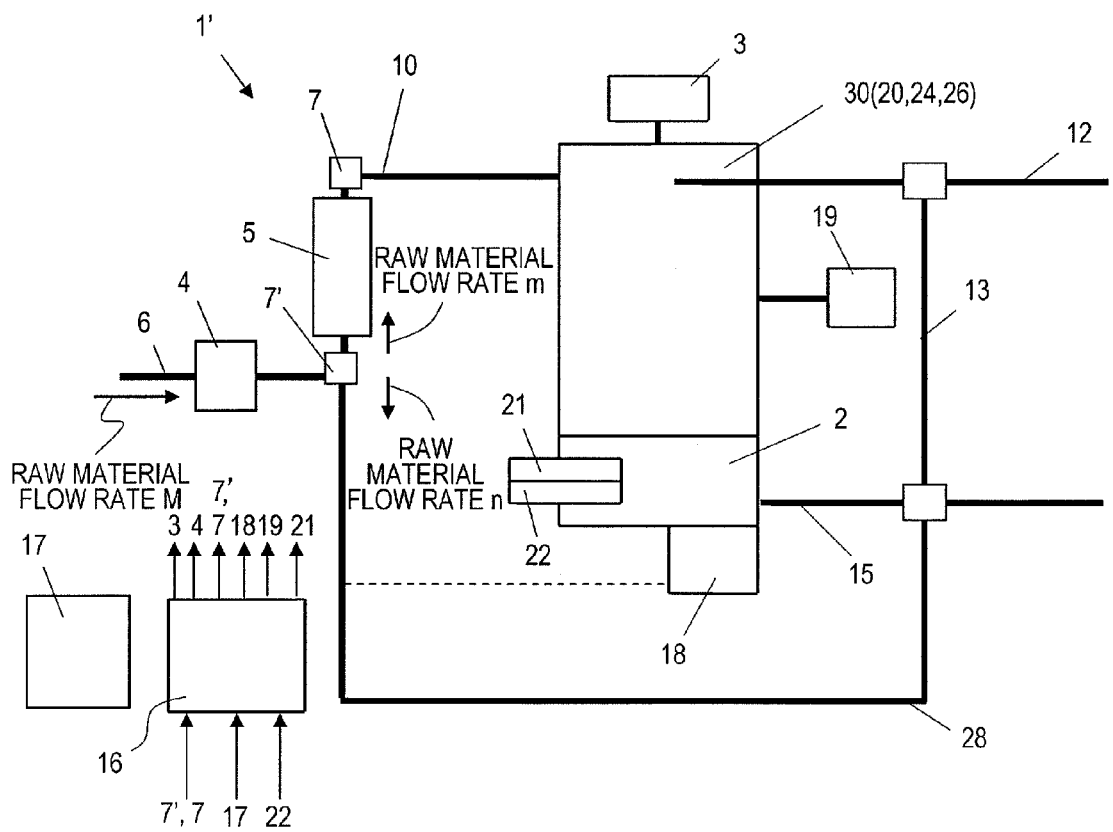
FIG. 8 is a structural view of a hydrogen generation apparatus in Embodiment 2 according to the present invention.

FIG. 8 is a structural view of a hydrogen generation apparatus in Embodiment 2 according to the present invention. Unlike the hydrogen generation apparatus 1 shown in FIG. 4, the hydrogen generation apparatus in this embodiment is structured such that a part of the raw material supplied from the gas infrastructure line can be sent to the combustor as combustion gas without being passed through the adsorbing desulfurization section.

In the hydrogen generation apparatus 1 described above with reference to FIG. 4, the raw material which has passed the adsorbing desulfurization section 5 can be sent to the combustor 2 and combusted together with hydrogen off-gas (assist combustion). However, the gas to be combusted in the combustor 2 may contain an odorizing component and does not need to pass the adsorbing desulfurization section 5. Therefore, the hydrogen generation apparatus in this embodiment is structured such that the raw material which has not passed the adsorbing desulfurization section is supplied to the combustor and combusted together with the hydrogen off-gas.

A hydrogen generation apparatus 1' includes a branching section 7' for branching the gas path between the gas infrastructure line 6 and the adsorbing desulfurization section 5 and a path 28 for sending raw material gas still containing the odorizing component from the branching section 7' to the combustion gas path 15. Owing to this, when necessary, the raw material gas which has not been desulfurized can be added to the hydrogen off-gas passing the combustion gas path 15 and supplied to the combustor 2. Herein, among the flow rate M of the raw material supplied from the outside of the hydrogen generation apparatus 1', the flow rate of the raw material to be sent to the reformer 30 via the adsorbing desulfurization section 5 will be referred to as the "raw material flow rate m", and the flow rate of the raw material to be sent to the combustor 2 via the path 28 will be referred to as the "raw material flow rate n".

In this embodiment also, during the driving after the adsorbing desulfurization section 5 is exchanged or regenerated, the raw material flow rate M is made higher than the raw material flow rate $M_0$ before the exchange or regeneration. At this point, the raw material flow rate n may be made equivalent to the flow rate before the exchange or regeneration, and only the flow rate m of the raw material to be sent to the adsorbing desulfurization section 5 may be made higher than the flow rate before the exchange or regeneration. The amount $\Delta m$ $(=M-M_0)$ by which the raw material flow rate m is to be increased may be set in advance based on the adsorbing ratio of the adsorbing agent used in the adsorbing desulfurization section 5 on the hydrocarbon component as in the above embodiment. According to such a structure, as in the above embodiment, even after the adsorbing desulfurization section 5 is exchanged or regenerated, the amount of the hydrogen-containing gas generated by the reformer 30 is stabilized and the hydrogen generation apparatus 1' can be operated stably.

Alternatively, during the driving after the exchange or regeneration, only the flow rate n of the raw material to be sent to the combustor 2 may be increased by $\Delta n$ $(=M-M_0)$ without increasing the flow rate m of the raw material to be sent to the adsorbing desulfurization section 5. Alternatively, both of the raw material flow rates m and n may be increased ($\Delta m + \Delta n = M-M_0$).

Increasing the flow rate n of the raw material to be sent to the combustor 2 after the adsorbing desulfurization section 5 is exchanged or regenerated has the following advantages. In a conventional hydrogen generation apparatus, when the hydrocarbon component is adsorbed in the adsorbing desulfurization section 5, the amount of the hydrogen-containing gas generated in the reformer 30 is decreased. As a result, the amount of the combustion gas such as hydrogen-containing gas, hydrogen off-gas or the like which is sent to the combustor 2 via the paths 13 and 15 is decreased. This causes a problem that a sufficient amount of combustion heat is not provided and so the starting time period is extended. By contrast, according to this embodiment, the decrease of the combustion gas can be suppressed by increasing the raw material flow rate n. This can shorten the starting time period and also stabilize the operation of the hydrogen generation apparatus 1'. There is no specific limitation on the increasing amount $\Delta n$ of the raw material flow rate n. In order to operate the hydrogen generation apparatus 1' more stably, it is preferable that the hydrogen generation apparatus 1' is controlled such that the combusting amount of the combustor 2 after the exchange or regeneration is equivalent to the combusting amount before the exchange or regeneration.

Embodiment 3

Hereinafter, a hydrogen generation apparatus in Embodiment 3 according to the present invention will be described with reference to the figures.

Figure 9:
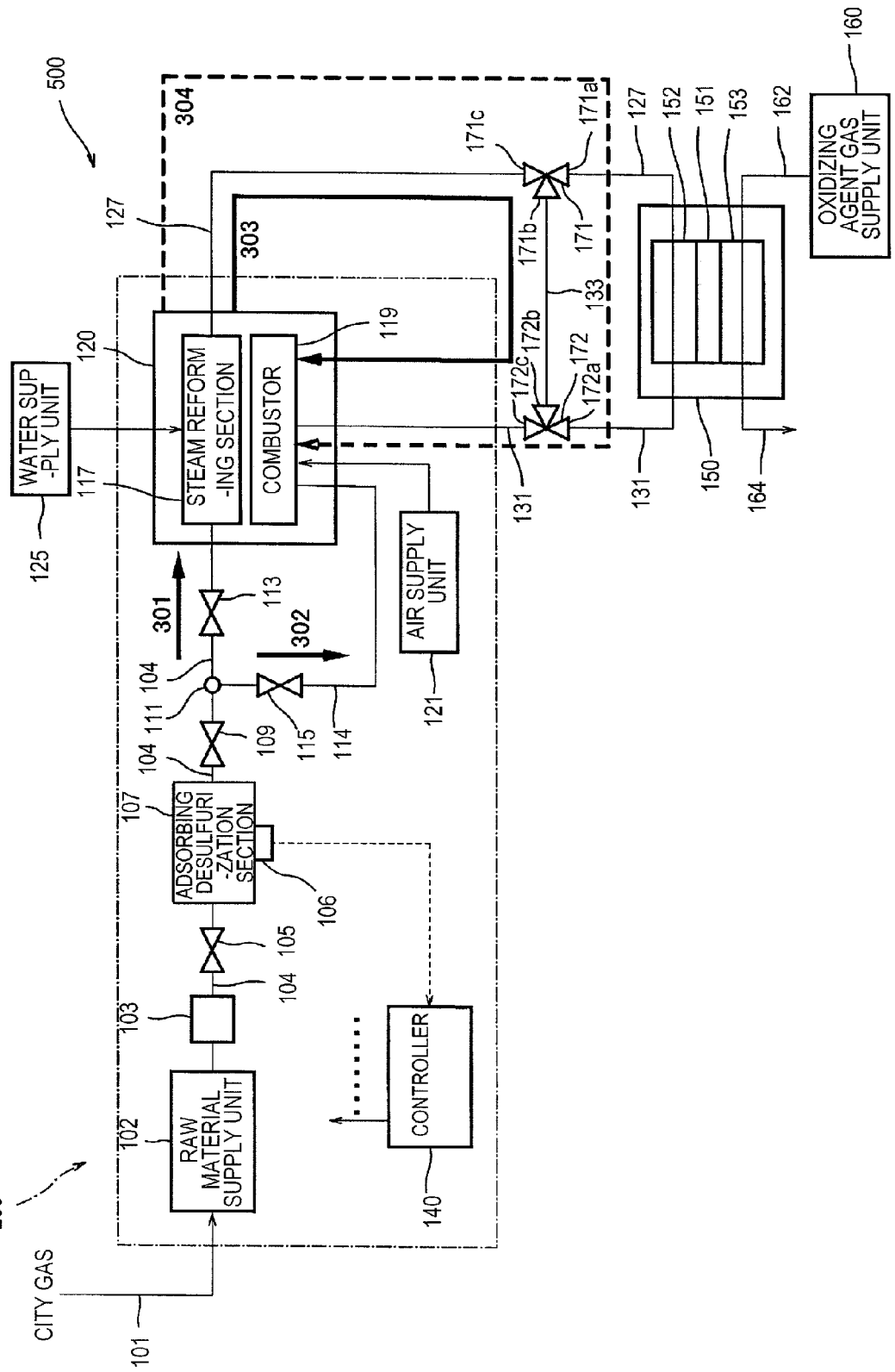
FIG. 9 is a block diagram showing a schematic structure of a fuel cell power generation system in Embodiment 3 according to the present invention.
Figure 10:
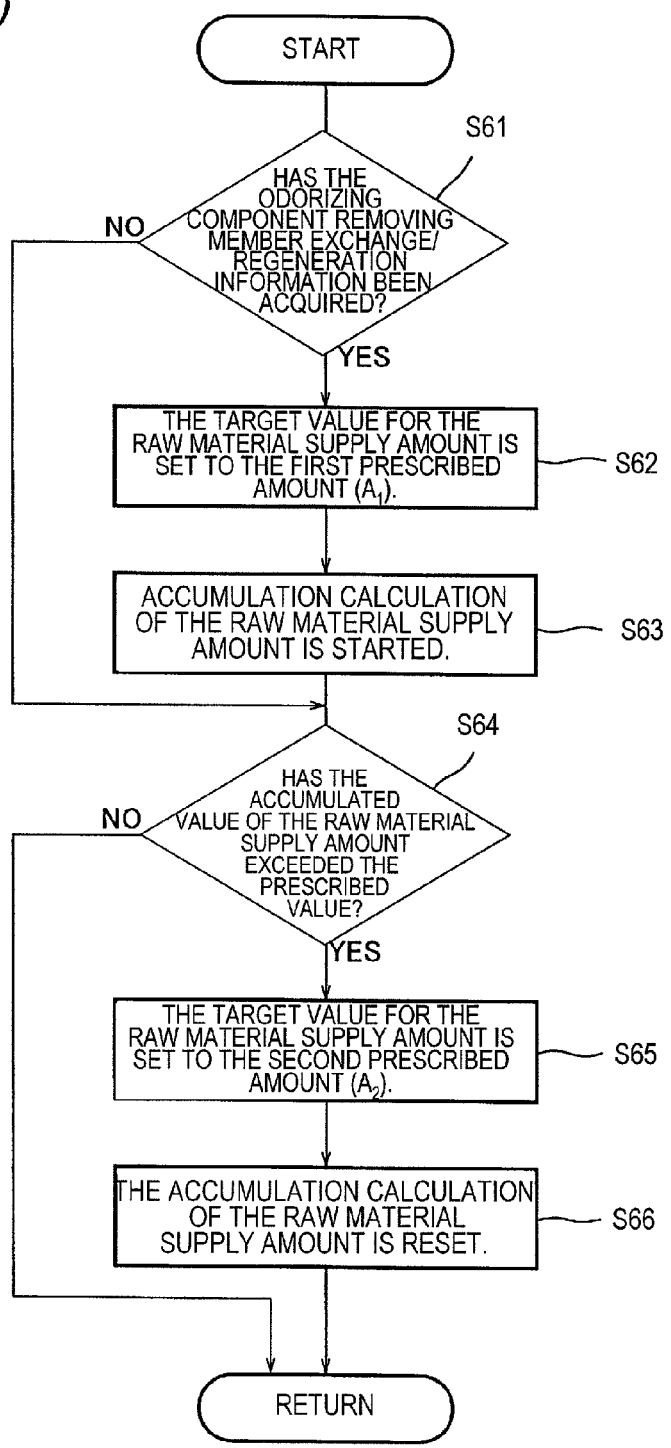
FIG. 10 is a flowchart showing particulars of a control program regarding odorizing component removing member exchange in the hydrogen generation apparatus in FIG. 9.

FIG. 9 is a block diagram showing a structure of a fuel cell power generation system using the hydrogen generation apparatus in this embodiment. FIG. 10 is a flowchart showing particulars of a control program regarding the odorizing component removing member exchange/regeneration in the hydrogen generation apparatus shown in FIG. 9.

A fuel cell power generation system 500 shown in FIG. 9 includes a fuel cell 150, a hydrogen generation apparatus 200, and an oxidizing agent gas supply unit 160. The structure of the hydrogen generation apparatus 200 will be described in detail later.

In this embodiment, the fuel cell 150 is formed of a polymer electrolytic fuel cell. The polymer electrolytic fuel cell is formed as a fuel cell stack by a plurality of cells stacked and tightened. Each cell includes an MEA (not shown) having a polymer electrolytic film 151 interposed between an anode 152 and a cathode 153, an anode-side separator (not shown) located on an anode 152-side main surface of the MEA, and a cathode-side separator (not shown) located on a cathode 153-side main surface of the MEA. The polymer electrolytic fuel cell is structured as is known, and so the detailed description other than the above will be omitted.

To the cathode 153 of the fuel cell 150, a downstream end of an oxidizing agent gas supply flow path 162 is communicated. An upstream end of the oxidizing agent gas supply flow path 162 is connected to the oxidizing agent gas supply unit 160. Because of this, oxidizing agent gas is supplied from the oxidizing agent gas supply unit 160 to the cathode 153. In this embodiment, air is used as the oxidizing agent gas. To the cathode 153, an upstream end of an oxidizing agent gas discharge flow path 164 is also communicated. A downstream end of the oxidizing agent gas discharge flow path 164 is open to the atmosphere (not shown).

To the anode 152 of the fuel cell 150, a downstream end of a hydrogen gas supply path (fuel gas supply flow path) 127 is communicated. An upstream end of the hydrogen gas supply path 127 is connected to the hydrogen generation apparatus 200 (fuel processing unit 120). Because of this, hydrogen-containing gas (fuel gas) generated in the fuel processing unit 120 is supplied to the anode 152. The fuel gas supplied to the anode 152 and the oxidizing agent gas supplied to the cathode 153 cause a cell reaction to generate heat and electricity.

In the middle of the hydrogen gas supply path 127, a first three-way valve 171 is provided. The first three-way valve 171 includes a first port 171a, a second port 171b and a third port 171c. The first three-way valve 171 is structured such that the third port 171c can be selectively communicated to the first port 171a or the second port 171b.

To the third port 171c of the first three-way valve 171, the hydrogen gas supply path 127 on the side of the hydrogen generation apparatus 200 (fuel processing unit 120) is connected.

The second port 171b of the first three-way valve 171 is connected to a second port 172b of a second three-way valve 172 described later via a fuel cell bypass path 133. The fuel cell bypass path 133 supplies fuel gas, which is supplied from the fuel processing unit 120, to a combustor 119 with the fuel cell 150 (anode 152) being bypassed.

To the first port 171a of the first three-way valve 171, the hydrogen gas supply path 127 on the side of the anode 152 of the fuel cell 150 is connected. To the anode 152 of the fuel cell 150, an upstream end of a combustion gas supply path (fuel gas discharge flow path) 131 is also communicated. Unreacted hydrogen-containing gas supplied from the hydrogen gas supply path 127 to the anode 152 but not reacted with the oxidizing gas flows to the combustion gas supply path 131, and then is sent to the combustor 119.

In the middle of the combustion gas supply path 131, the second three-way valve 172 is provided. The second three-way valve 172 includes a first port 172a, the second port 172b and a third port 172c. The second three-way valve 172 is structured such that the third port 172c can be selectively communicated to the first port 172a or the second port 172b.

To the first port 172a of the second three-way valve 172, the combustion gas supply path 131 on the side of the fuel cell 150 is connected.

As described above, to the second port 172b of the second three-way valve 172, the second port 171b of the first three-way valve 171 is connected via the bypass flow path 133.

To the third port 172c of the second three-way valve 172, the combustion gas supply path 131 on the side of the combustor 119 is connected. A downstream end of the combustion gas supply path 131 is connected to the combustor 119. To the combustor 119, unreacted fuel gas which has flown out from the anode 152 or the fuel gas which has bypassed the fuel cell 150 (anode 152) (i.e., the fuel gas which has flown through the fuel cell bypass path 133) is supplied. The combustor 119 combusts the unreacted fuel gas discharged from the anode 152 or the like, and transmits the heat generated during the combustion to the steam reforming section 117. This heat is used for the reforming reaction of the raw material and water in the steam reforming section 117.

Now, the hydrogen generation apparatus 200 in this embodiment will be described in detail. First, a hardware system of the hydrogen generation apparatus 200 will be described. Herein, an apparatus for generating hydrogen using raw material gas containing a sulfur compound as an odorizing component will be described as an example.

As shown in FIG. 9, the hydrogen generation apparatus 200 in this embodiment includes a raw material supply unit 102, an adsorbing desulfurization section (odorizing component removing section) 107 for adsorbing and thus removing a sulfur compound as an odorizing component, the fuel processing unit 120, a sensor 106 acting as exchange/regeneration information acquisition means, and a controller 140 as main elements.

The raw material supply unit 102 is formed of, for example, a plunger pump, a flow rate adjusting unit or the like, and is connected to an existing city gas infrastructure 101. The gas infrastructure 101 supplies city gas as the raw material gas to the raw material supply unit 102. The city gas supplied from the gas infrastructure 101 to the raw material supply unit 102 contains a sulfur compound as an odorant. To the raw material supply unit 102, an upstream end of a raw material supply path 104 is connected. A downstream end of the raw material supply path 104 is connected to the fuel processing unit 120. On the raw material supply path 104, an accumulated flow meter 103, a first open/close valve 105, an adsorbing desulfurization section 107, a second open/close valve 109, a branching section 111, and a third open/close valve 113 are provided in this order from upstream to downstream. Because of this, the raw material gas supplied from the gas infrastructure 101 to the raw material supply unit 102 is supplied to the adsorbing desulfurization section 107. The accumulated flow meter 103 measures the accumulated flow rate of the raw material gas supplied from the raw material supply unit 102 to the adsorbing desulfurization section 107. The first open/close valve 105 and the second open/close valve 109 are for opening or closing the raw material supply path 104 at the time of an exchange or regeneration of the adsorbing agent in the adsorbing desulfurization section 107.

The adsorbing desulfurization section (also referred to as the "adsorbing removing unit") 107 contains has an adsorbing agent (adsorbing removing agent). The adsorbing agent in this embodiment adsorbs and thus removes the sulfur compound contained in the raw material gas supplied to the adsorbing desulfurization section 107. As the adsorbing agent, a zeolite-based adsorbing agent is used, for example. Any known zeolite-based adsorbing agent is usable, and the detailed description thereof will be omitted. In the case where hydrocarbon-based gas containing an odorizing component other than a sulfur compound is used as the raw material gas, an adsorbing agent for adsorbing such an odorizing component is used instead of the agent for adsorbing the sulfur compound.

To the branching section 111, an upstream end of a combustion raw material gas supply flow path 114 is connected. A downstream end of the combustion raw material gas supply flow path 114 is connected to the combustor 119. On the combustion raw material gas supply flow path 114, a flow rate adjusting valve 115 is provided. The flow rate adjusting valve 115 adjusts the amount of the raw material gas to be supplied from to the combustor 119 under the control of the controller 140.

The raw material gas deprived of the sulfur compound by the adsorbing desulfurization section 107 is supplied to the fuel processing unit 120 (steam reforming section 117 or the combustor 119) via the raw material supply path 104.

The fuel processing unit 120 includes a reformer including the steam reforming section 117, a shift converting section (not shown) and a selective oxidation section (not shown) and also the combustor 119.

Herein, the combustor 119 is formed of a flame burner. The combustor 119 includes a combustion chamber (not shown), a distributor (not shown) for jetting combustion gas into the combustion chamber, an air chamber (not shown) for jetting combustion air from a combustion air supply unit 121 described later into the combustion chamber, an ignition section (not shown) for igniting and thus combusting the combustion gas and the combustion air in the combustion chamber, and a combustion detection section (not shown) for detecting a flame at the time of combustion. The ignition section is formed of an igniter using piezoelectric discharge. The combustion detection section is formed of a flame rod for measuring an ion current in the combustion chamber. The combustor 119 is structured as is known (for example, Japanese Laid-Open Patent Publication No. 2006-286279) and the detailed description thereof will be omitted.

To the combustor 119, the combustion air supply unit 121 is connected. The combustion air supply unit 121 supplies the combustion air to the combustor 119. To the combustor 119, raw material gas which has flown out from the adsorbing desulfurization section 107 (combustion gas), fuel gas having a carbon monoxide concentration which has not been reduced to a sufficiently low level to be supplied to the fuel cell 150 (combustion gas) or unreacted discharged fuel gas discharged from the anode 152 of the fuel cell 150 (off-gas:combustion gas) is supplied as the fuel to be combusted. The combustor 119 combusts such gas and supplies the heat to the steam reforming section 117. The combustor 119 may be incorporated into the fuel processing unit 120 as in this embodiment, or may be provided as a separate element from the fuel processing unit 120.

The steam reforming section 117 contains a reforming catalyst. To the steam reforming section 117, a water supply unit 125 is connected. In this embodiment, the water supply unit 125 is structured as is known, and includes, for example, a water supply source such as a water tank or the like, a pump, a flow rate adjusting unit and the like as the elements. The water supply unit 125 supplies water (steam) necessary for the reforming reaction to the steam reforming section 117. As the water to be supplied, water obtained by purifying tap water with activated carbon, an ion exchange resin or the like in advance is used. To the steam reforming section 117, the raw material gas deprived of the sulfur compound by the adsorbing desulfurization section 107 and water supplied by the water supply unit 125 are supplied. The steam reforming section 117 causes a reforming reaction using the supplied raw material gas, the supplied water and the reforming catalyst to generate hydrogen-containing gas. For the reforming reaction, heat transmitted from the combustor 119 is used. The hydrogen-containing gas generated in the steam reforming section 117 is supplied to the shift converting section.

The shift converting section contains a sift catalyst. The shift converting section, using the sift catalyst, causes a shift reaction of carbon monoxide contained in the hydrogen-containing gas supplied from the steam reforming section 117 to reduce the concentration of the carbon monoxide. The hydrogen-containing gas having the carbon monoxide concentration reduced by the shift converting section is supplied to the selective oxidation section.

The selective oxidation section contains a CO oxidizing catalyst. The selective oxidation section, using the CO oxidizing catalyst, causes a CO oxidation reaction of the carbon monoxide contained in the hydrogen-containing gas supplied from the shift converting section to further reduce the concentration of the carbon monoxide. Specifically, the concentration of the carbon monoxide contained in hydrogen-containing gas is reduced to 20 ppm or lower, preferably to 10 ppm or lower. The hydrogen-containing has having the carbon monoxide concentration reduced in this manner is supplied to the anode 152 of the fuel cell 150 as fuel gas.

Now, a control system of the hydrogen generation apparatus 200 in this embodiment will be described.

The hydrogen generation apparatus 200 in this embodiment includes the sensor 106 as the exchange/regeneration information acquisition means. The sensor 106 is provided in the adsorbing desulfurization section 107. The sensor 106 detects information that the adsorbing desulfurization section 107 or the adsorbing agent contained in the adsorbing desulfurization section 107 has been exchanged/regenerated (odorizing component removing member exchange/regeneration information) and inputs this information to the controller 140 described later. In this embodiment, a contact-type sensor such as a contact switch or the like is used as the sensor 106. Such a sensor is attached to the adsorbing agent or an attaching section of the adsorbing desulfurization section 107. The sensor 106 such as a contact switch or the like is turned on or off when the adsorbing desulfurization section 107 or the adsorbing agent is attached or detached, and this on/off signal is input to the controller 140 described later as the odorizing component removing member exchange/regeneration information.

The hydrogen generation apparatus 200 includes the controller 140. The controller 140 is formed of a calculation device such as a microcomputer or the like. Herein, the controller 140 controls elements which need to be controlled, including the above-described elements, of the hydrogen generation apparatus 200 and the fuel cell power generation system 500 to control the operation of the hydrogen generation apparatus 200 and the fuel cell power generation system 500. In this embodiment, the hydrogen generation apparatus 200 includes the controller 140. Alternatively, a controller (not shown) included in the fuel cell power generation system 500 may also act as a control section for controlling the operation of the hydrogen generation apparatus 200. In this specification, the control section means a group of a plurality of controllers which execute control in cooperation with each other, as well as a single controller. Accordingly, the controller 140 does not necessarily need to be formed of a single controller. A plurality of controllers may be located in a distributed manner and are structured to control the operation of the hydrogen generation apparatus 200 and the fuel cell power generation system 500 in cooperation with each other.

Now, an operation of the hydrogen generation apparatus 200 and the fuel cell power generation system 500 will be described with respect to FIG. 10. In this embodiment, the operation of the hydrogen generation apparatus 200 and the fuel cell power generation system 500 is performed under the control of the controller 140.

The controller 140 supplies the city gas as the raw material gas by the raw material supply unit 102 in the state where the first open/close valve 105 and the second open/close valve 109 are opened. Because of this, the raw material gas flows to the adsorbing desulfurization section 107 via the raw material supply path 104. At this point, the adsorbing agent contained in the adsorbing desulfurization section 107 adsorbs and thus removes the sulfur compound in the raw material gas.

When the adsorbing agent does not sufficiently adsorb the sulfur compound anymore and the sulfur concentration at the exit of the adsorbing desulfurization section becomes high (when the sulfur compound breaks through the adsorbing desulfurization section), the entire adsorbing desulfurization section 107 or the adsorbing agent contained in the adsorbing desulfurization section 107 needs to be exchanged or regenerated.

Namely, when the adsorbing agent does not sufficiently adsorb the sulfur compound anymore and the sulfur concentration at the exit of the adsorbing desulfurization section becomes high (when the sulfur compound breaks through the adsorbing desulfurization section), the sulfur compound poisons the reforming catalyst and so the normal operation cannot be provided. When this occurs, the steam reforming section 117 or the like needs to be exchanged. In order to avoid such an inconvenience, the adsorbing desulfurization section 107 needs to be exchanged or regenerated before the sulfur compound breaks through the adsorbing desulfurization section 107.

Next, the controller 140 closes the third open/close valve 113 and opens the flow rate adjusting valve 115 to a prescribed opening angle. Because of this, the raw material gas (combustion gas) which has flown out from the adsorbing desulfurization section 107 is supplied to the combustor 119 via the combustion raw material gas supply flow path 114 (arrow 302 in FIG. 9). In parallel with this, the controller 140 supplies the combustion air to the combustor 119 by the combustion air supply unit 121. In this embodiment, in this case, the combustion air is supplied such that the air ratio ($\lambda$=Vb/Va) is 1.5. The air ratio ($\lambda$) is appropriately set in accordance with the combustion characteristic of the combustor 119. The controller 140 causes the combustor 119 to ignite the combustion gas by an ignition section not shown to combust the combustion gas with the combustion air, thus to supply heat to the steam reforming section 117. In this manner, the temperatures of the elements of the fuel processing unit 120 (steam reforming section 117, the shift converting section and the selective oxidation section which are not shown) rise.

At the time when the temperature of the steam reforming section 117 becomes 400° C., the temperature of the shift converting section becomes 150° C. and the temperature of the selective oxidation section becomes 100° C., the controller 140 opens the third open/close valve 113 and then closes the flow rate adjusting valve 115. Because of this, the raw material gas which has flown out from the adsorbing desulfurization section 107 is supplied to the steam reforming section 117 via the raw material gas supply path 104 (arrow 301 in FIG. 9). The settings on the temperatures of the steam reforming section 117, the shift converting section and the selective oxidation section can be appropriately changed in accordance with the structures of the hydrogen generation apparatus 200 and the combustor 119 and the type and amount of the catalyst used in the steam reforming section 117 or the like. In parallel with this, the controller 140 operates the water supply unit 125 to supply water (steam) to the steam reforming section 117. In this embodiment, water is supplied such that the steam-to-carbon ratio (S/C) is 3. The raw material gas supplied to the steam reforming section 117 is reformed by the steam with the reforming catalyst to become hydrogen-containing gas. The hydrogen-containing gas contains carbon monoxide, and the carbon monoxide concentration is reduced by the shift converting section and the selective oxidation section as described above. The hydrogen-containing gas (fuel gas) having the carbon monoxide concentration reduced in this manner is supplied to the hydrogen gas supply path 127. In this case, in the combustor 119, fuel gas (combustion gas) supplied from the combustion gas supply path 131 to the combustor 119 is combusted instead of the raw material gas.

Immediately after the fuel gas starts to be supplied from the combustion processing unit 120 to the hydrogen gas supply path 127, the carbon monoxide concentration of the fuel gas has not been sufficiently reduced. If such fuel gas is supplied to the anode 152 of the fuel cell 150 as it is, the fuel gas poisons the anode 152. In order to avoid this, the controller 140 causes the third port 171c of the first three-way valve 171 to communicate to the second port 171b and causes the third port 172c of the second three-way valve 172 to communicate to the second port 172b. Because of this, the fuel gas supplied from the fuel processing unit 120 to the hydrogen gas supply path 127 is supplied to the combustor 119 via the fuel cell bypass path 133 (arrow 303 in FIG. 9). The fuel gas supplied to the combustor 119 is combusted by the combustor 119, and heat generated by the combustion is transmitted to the steam reforming section 117.

Then, when the carbon monoxide concentration of the fuel gas to be supplied from the fuel processing unit 120 to the hydrogen gas supply path 127 is sufficiently reduced, the controller 140 causes the third port 171c of the first three-way valve 171 to communicate to the first port 171a and causes the third port 172c of the second three-way valve 172 to communicate to the first port 172a. Because of this, the fuel gas supplied from the combustion processing unit 120 to the hydrogen gas supply path 127 flows to the anode 152 of the fuel cell 150. In parallel with this, the controller 140 operates the oxidizing agent gas supply unit 160 to supply the oxidizing agent gas to the cathode 153 of the fuel cell 150. In this manner, electricity and heat are generated by a cell reaction of the fuel gas supplied to the anode 152 and the oxidizing agent gas supplied to the cathode 153. The off-gas (combustion gas) discharged from the anode 152 is supplied to the combustor 119 via the combustion gas supply path 131 (arrow 304 in FIG. 9) and is combusted by the combustor 119.

Now, a distinctive operation of the hydrogen generation apparatus 200 will be described with reference to FIG. 10.

First, the controller 140 determines whether or not odorizing component removing member exchange/regeneration information has been acquired (step S61). When the odorizing component removing member exchange/regeneration information has been acquired by the adsorbing desulfurization section 107 or the adsorbing agent contained in the adsorbing desulfurization section 107 being exchanged or regenerated (YES in step S61), the controller 140 sets the target value for the supply amount of the raw material gas from the raw material supply unit 102 to the adsorbing desulfurization section 107 to a first prescribed amount ($A_1$) (step S62). The first prescribed amount ($A_1$) is larger than the supply amount of the raw material gas from the raw material supply unit 102 to the adsorbing desulfurization section 107 during the normal driving (immediately before the odorizing component removing member exchange/regeneration information is acquired) (such an amount is a second prescribed amount ($A_2$) described later). Then, the controller 140 starts an accumulation calculation of the supply amount of the raw material gas from the raw material supply unit 102 to the adsorbing desulfurization section 107 by the accumulated flow meter 103 (step S63).

Next, the controller 140 determines whether or not the accumulated value of the supply amount of the raw material from the raw material supply unit 102 to the adsorbing desulfurization section 107 has exceeded a prescribed value (in this embodiment, 40 L) (step S64). The prescribed value for the accumulated value of the supply amount of the raw material is defined by the adsorbing characteristic of the adsorbing agent contained in the adsorbing desulfurization section 107, namely, the type, amount (mass) or the like of the adsorbing agent, and can be appropriately changed. When the accumulated value of the supply amount of the raw material from the raw material supply unit 102 to the adsorbing desulfurization section 107 has exceeded the prescribed value, the adsorbing agent contained in the adsorbing desulfurization section 107 does not substantially adsorb the raw material gas anymore and adsorbs only the sulfur compound contained in the raw material gas. Thus, when the accumulated value of the supply amount of the raw material gas from the raw material supply unit 102 to the adsorbing desulfurization section 107 has exceeded the prescribed value (YES in step S64), the controller 140 sets the target value for the supply amount of the raw material gas from the raw material supply unit 102 to the adsorbing desulfurization section 107 to the second prescribed value ($A_2$) (step S65). The second prescribed value ($A_2$) is smaller than the first prescribed value ($A_1$) ($A_2 < A_1$). The second prescribed value ($A_2$) is also the supply amount of the raw material gas from the raw material supply unit 102 to the adsorbing desulfurization section 107 during the normal driving (immediately before the odorizing component removing member exchange/regeneration information is acquired). Then, the controller 140 resets the accumulation calculation of the supply amount of the raw material (step S66), and returns the processing to step S61.

By contrast, when the odorizing component removing member exchange/regeneration information has not been acquired in step S61 (NO in step S61), the controller 140 advances the processing to step S64 and determines whether or not the accumulated value of the supply amount of the raw material from the raw material supply unit 102 to the adsorbing desulfurization section 107 has exceeded the prescribed amount (step S64). However, in this case, the accumulation calculation of the supply amount of the raw material gas from the raw material supply unit 102 to the adsorbing desulfurization section 107 has not been performed. Therefore, the accumulated value cannot exceed the prescribed amount (NO in step S64), and the controller 140 returns the processing to step S61. Namely, the raw material gas is kept to be supplied from the raw material supply unit 102 to the adsorbing desulfurization section 107 in the second prescribed amount ($A_2$) set in step S65 described above.

According to the hydrogen generation apparatus 200 in this embodiment, immediately after the adsorbing desulfurization section 107 or the adsorbing agent contained in the adsorbing desulfurization section 107 is exchanged or regenerated, namely, when the adsorbing ability of the adsorbing agent is high, the supply amount of the raw material gas is increased. Therefore, even if the raw material gas is adsorbed by the adsorbing agent, the decrease of the flow rate of the raw material gas which has passed the adsorbing desulfurization section 107 is suppressed. Accordingly, the amount of the raw material passing the adsorbing desulfurization section 107 and reformed by the steam reforming section 117 and the amount of the hydrogen-containing gas generated in the steam reforming section 117 are stabilized. Therefore, the hydrogen generation apparatus 200 does not need a long time to be started and the operation of the hydrogen generation apparatus 200 is stabilized.

Where the raw material gas is supplied immediately after the adsorbing desulfurization section 107 or the adsorbing agent contained in the adsorbing desulfurization section 107 is exchanged or regenerated, namely, when the adsorbing ability of the adsorbing agent is high, there may be a time period in which the flow rate of the raw material gas flowing out from the adsorbing desulfurization section 107 is not constant. In this embodiment, in such a time period, the raw material gas flowing out from the adsorbing desulfurization section 107 is used as combustion gas to be supplied to the combustor 119. Therefore, the raw material gas is not consumed in waste and so the energy loss is small.

When the adsorbing agent contained in the adsorbing desulfurization section 107 does not substantially adsorb the raw material gas anymore, the supply amount of the raw material gas from the raw material supply unit 102 to the adsorbing desulfurization section 107 is returned to that during the normal driving. Owing to this, the steam reforming section 117 stably generates the hydrogen-containing gas. This further stabilizes the operation of the hydrogen generation apparatus 200.

In this embodiment, the combustion raw material gas supply flow path 114 is provided for flowing the raw material gas from the adsorbing desulfurization section 107 to the combustor 119. The hydrogen generation apparatus 200 may be structured without the combustion raw material gas supply flow path. In this case, the combustion gas supplied to the combustor 119 is the fuel gas supplied from the fuel cell bypass path 133 to the combustor 119 (fuel gas having a carbon monoxide concentration which has not been reduced to a sufficiently low level to be supplied to the anode 152 of the fuel cell 150) and the unreacted fuel gas (off-gas) supplied from the anode 152 to the combustor 119 via the combustion gas supply path 131.

In this embodiment, the target value for the supply amount of the raw material gas from the raw material supply unit 102 to the adsorbing desulfurization section 107 is controlled to be changed from the first prescribed amount ($A_1$) to the second prescribed amount ($A_2$) in one step. The first prescribed amount ($A_1$) may be controlled to be changed to the second prescribed amount ($A_2$) step by step. For controlling the target value for the supply amount of the raw material gas to be changed step by step, the raw material gas is supplied, for example, as follows. Until the accumulated raw material flow rate becomes 7 L, the raw material gas is supplied at 1.8 L/min. (120% of the supply amount of the raw material gas during the normal driving); until the accumulated raw material flow rate becomes 40 L from 7 L, the raw material gas is supplied at 1.65 L/min. (110% of the supply amount of the raw material gas during the normal driving); and after the accumulated raw material flow rate reaches 40 L, the raw material gas is supplied at 1.5 L/min. (the supply amount of the raw material gas during the normal driving). Alternatively, the target value for the supply amount of the raw material gas may be controlled to be changed gradually from the first prescribed amount ($A_1$) to the second prescribed amount ($A_2$). With such a structure, the amount of the raw material gas flowing out from the adsorbing desulfurization section 107 is more stabilized, and the hydrogen-containing gas is generated by the steam reforming section 117 more stably. Thus, the operation of the adsorbing desulfurization section 200 is more stabilized.

Still alternatively, the adsorbing characteristic of the adsorbing agent contained in the adsorbing desulfurization section 107 may be input to the controller 140, so that the controller 140 is controlled to change the prescribed value for the accumulated raw material flow rate or the supply amount of the raw material gas in accordance with the adsorbing characteristic.

With such a structure, the combustion heat is stably supplied from the combustor to the reformer. Therefore, the hydrogen-containing gas can be stably generated by the reformer. This stabilizes the operation of the hydrogen generation apparatus. In other words, when the combustion heat of an amount closer to a prescribed amount is supplied from the combustor to the reformer, the temperature of the reformer (and so, of the hydrogen generation apparatus) rises to be close to a prescribed temperature. Therefore, the hydrogen generation apparatus can be started normally.

Variation Example 1

In this variation example, as compared with the hydrogen generation apparatus 200 described above, the exchange/regeneration information acquisition means for the adsorbing agent or the adsorbing desulfurization section 107 is different.

Specifically in this variation example, an IC tag reader is used as the sensor 106. The adsorbing agent or the adsorbing desulfurization section 107 has an IC tag or the like attached thereto which stores an individual number unique thereto. The IC tag reader inputs the read IC tag to the controller 140. When the individual number of the IC tag is changed, the controller 140 determines that the adsorbing agent or the adsorbing desulfurization section 107 has been exchanged. Except for this, the hydrogen generation apparatus in this variation example is substantially the same as the hydrogen generation apparatus 200 described above with reference to FIG. 9. With such a structure also, substantially the same effects as those of the hydrogen generation apparatus 200 are provided.

Variation Example 2

In this variation example, as compared with the hydrogen generation apparatus 200 described above, the exchange/regeneration information acquisition means for the adsorbing agent or the adsorbing desulfurization section 107 is different.

Specifically in this variation example, no sensor is provided and the information that the adsorbing agent or the adsorbing desulfurization section 107 has been exchanged is manually input to a switch not shown, the control section 40 or the like. Except for this, the hydrogen generation apparatus in this variation example is substantially the same as the hydrogen generation apparatus 200 described above with reference to FIG. 9. With such a structure also, substantially the same effects as those of the hydrogen generation apparatus 200 are provided.

Embodiment 4

Figure 11:
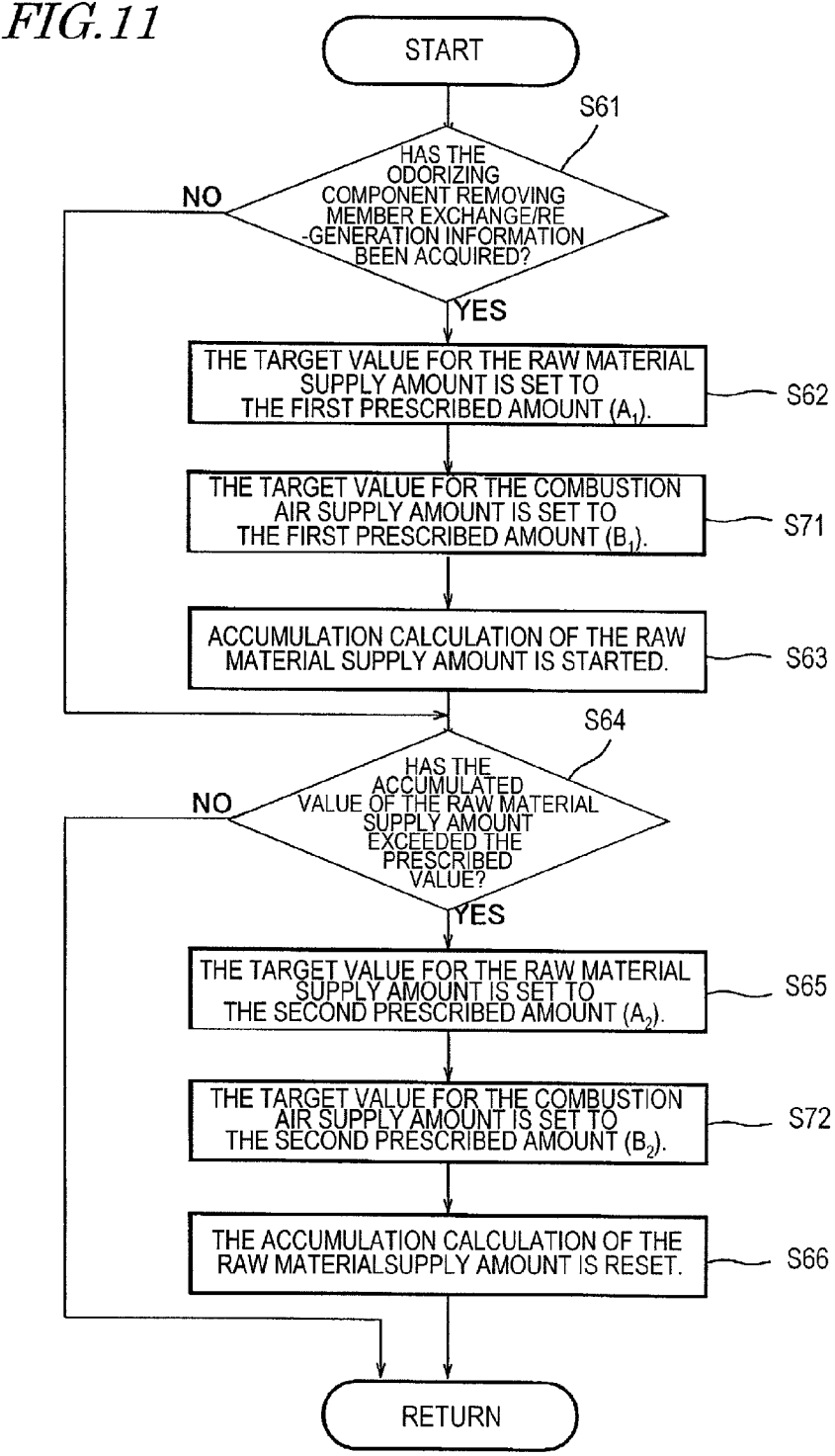
FIG. 11 is a flowchart showing particulars of a control program regarding odorizing component removing member exchange in a hydrogen generation apparatus in Embodiment 4 according to the present invention.

FIG. 11 is a flowchart showing particulars of a control program regarding the odorizing component removing member exchange in a hydrogen generation apparatus in Embodiment 4. In FIG. 11, steps corresponding to those of FIG. 10 bear the same reference numerals therewith and descriptions thereof will be omitted. Hereinafter, the hydrogen generation apparatus in this embodiment will be described with reference to FIG. 11.

In the hydrogen generation apparatus in this embodiment, as compared with the hydrogen generation apparatus in Embodiment 3 shown in FIG. 9, the control program regarding the odorizing component removing member exchange is different. Specifically, the step of setting a target value for the amount of the combustion air to be supplied to the combustor 119 is added to the steps of the control program in Embodiment 3.

Specifically, as shown in FIG. 11, the controller 140 sets the target value for the supply amount of the raw material gas from the raw material supply unit 102 to the adsorbing desulfurization section 107 to the first prescribed amount ($A_1$) in step S62, and after this, sets the target value for the supply amount of the combustion air from the combustion air supply unit 121 to the combustor 119 to a first prescribed amount ($B_1$) (step S71). The first prescribed amount ($B_1$) is calculated to provide an air ratio corresponding to the combustion characteristic of the combustor 119. Then, the controller 140 starts an accumulation calculation of the supply amount of the raw material gas from the raw material supply unit 102 to the adsorbing desulfurization section 107 by the accumulated flow meter 103 (step S63).

As shown in FIG. 11, the controller 140 sets the target value for the supply amount of the raw material gas from the raw material supply unit 102 to the adsorbing desulfurization section 107 to the second prescribed amount ($A_2$) in step S65, and after this, sets the target value for the supply amount of the combustion air from the combustion air supply unit 121 to the combustor 119 to a second prescribed amount ($B_2$) (step S72). The second prescribed amount ($B_2$) is smaller than the first prescribed amount ($B_1$) ($B_2<B_1$) The second prescribed amount ($B_2$) is the supply amount of the combustion air from the combustion air supply unit 121 to the combustor 119 during the normal driving (immediately before the odorizing component removing member exchange/regeneration information is acquired). Then, the controller 140 resets the accumulation calculation of the supply amount of the raw material (step S66), and returns the processing to step S61. Except for this, the control program in this embodiment is substantially the same as the control program in Embodiment 3. Accordingly, in this embodiment, the raw material gas is kept to be supplied from the raw material supply unit 102 to the adsorbing desulfurization section 107 in the second prescribed amount ($A_2$) set in step S65, and also the combustion air is kept to be supplied from the combustion air supply unit 121 to the combustor 119 in second prescribed amount ($B_2$) set in step S72.

With such a structure also, substantially the same effects as those of the hydrogen generation apparatus 200 in Embodiment 3 are provided.

With such a structure, the supply amount of the combustion air from the combustion air supply unit 121 to the combustor 119 is controlled to provide an air ratio corresponding to the combustion characteristic of the combustor 119. Therefore, the combustion heat supplied from the combustor 119 to the steam reforming section 117 is made substantially constant. Owing to this, the hydrogen-containing gas is generated stably by the steam reforming section 117, and so the operation of the hydrogen generation apparatus 200 is stabilized.

In this embodiment, the supply amount of the combustion air from the combustion air supply unit 121 to the combustor 119 is controlled to provide an air ratio corresponding to the combustion characteristic of the combustor 119. Alternatively, the supply amount of the combustion gas to the combustor 119 may be controlled to provide an air ratio corresponding to the combustion characteristic of the combustor 119. In this case, the combustion gas is the raw material gas supplied from the combustion raw material gas supply flow path 114 to the combustor 119, the fuel gas supplied from the fuel cell bypass path 133 to the combustor 119 (fuel gas having a carbon monoxide concentration which has not been reduced to a sufficiently low level to be supplied to the fuel cell 150) and the unreacted fuel gas (off-gas) supplied from the anode 152 to the combustor 119 via the combustion gas supply path 131. With such a structure also, the combustion heat supplied from the combustor 119 to the steam reforming section 117 is made substantially constant. Owing to this, the hydrogen-containing gas is generated stably by the steam reforming section 117, and so the operation of the hydrogen generation apparatus 200 is stabilized.

In this embodiment, the target value for the supply amount of the combustion air from the combustion air supply unit 121 to the combustor 119 is controlled to be changed from the first prescribed amount ($B_1$) to the second prescribed amount ($B_2$) in one step. The first prescribed amount ($B_1$) may be controlled to be changed to the second prescribed amount ($B_2$) step by step. Alternatively, the target value for the supply amount of the combustion air may be controlled to be changed gradually from the first prescribed amount ($B_1$) to the second prescribed amount ($B_2$). With such a structure, the combustion heat supplied from the combustor 119 to the steam reforming section 117 is more stabilized. Owing to this, the hydrogen-containing gas is generated more stably by the steam reforming section 117, and so the operation of the hydrogen generation apparatus 200 is more stabilized.

Still alternatively, the adsorbing characteristic of the adsorbing agent contained in the adsorbing desulfurization section 107 may be input to the controller 140, so that the controller 140 is controlled to change the supply amount of the combustion air in accordance with the adsorbing characteristic.

Experiment Example 1

Figure 12:
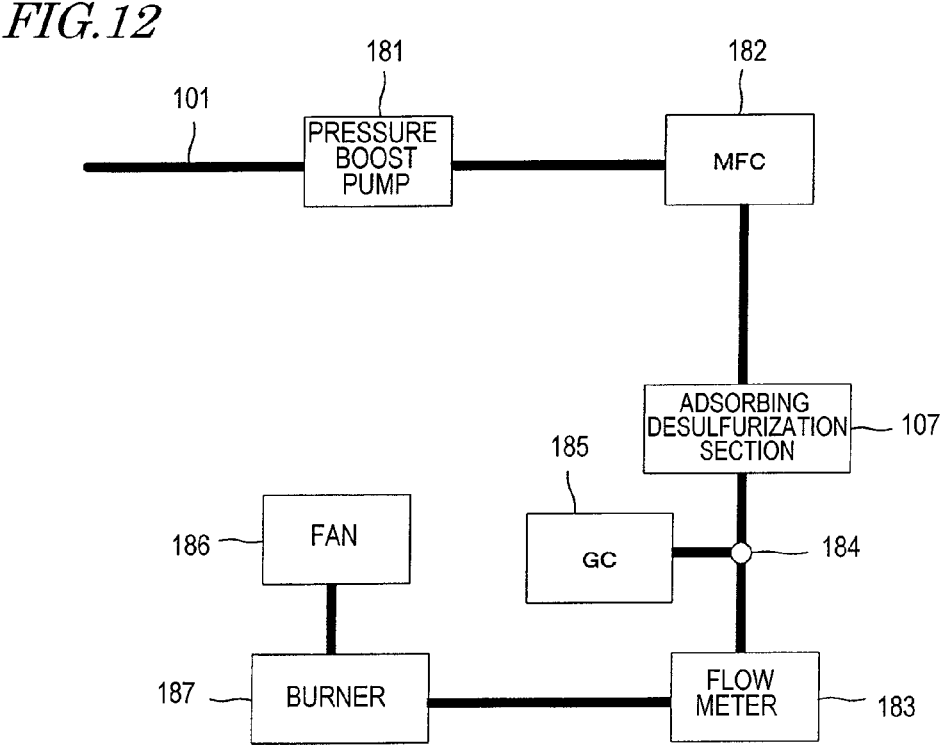
FIG. 12 is a schematic view showing a structure of an experimental device for checking the adsorbing ability of an adsorbing desulfurization section used in a hydrogen generation apparatus according to the present invention.

FIG. 12 is a schematic view showing a structure of an experimental device for checking the adsorbing ability of the adsorbing desulfurization section used in the hydrogen generation apparatus according to the present invention on the hydrocarbon component. Hereinafter, the experimental device will be described with reference to FIG. 12.

As shown in FIG. 12, this experimental device is structured using the gas infrastructure 101 for the city gas (13A). Specifically, a pressure boost pump 181, a mass flow controller (MFC) 182, the adsorbing desulfurization section 107, a branching section 184, a flow meter 183, and a burner 187 are provided in the gas infrastructure 101 from upstream to downstream.

The pressure boost pump 181 boosts the pressure of the city gas flowing in the gas infrastructure 101 to 20 kPa.

The mass flow controller 182 controls the flow rate of the city gas to be supplied from the gas infrastructure 101 to the adsorbing desulfurization section 107.

The adsorbing desulfurization section 107 is the same as that described in each of the above embodiments. In this experimental device, the adsorbing desulfurization section 107 contains 90 g of zeolite (produced by Tosoh Corporation; Zeolam F-9 (trade name)) as the adsorbing agent.

To the branching section 184, a gas chromatographer (GC) 185 is connected. The gas chromatographer 185 performs an online analysis on the composition of the gas flowing out from the adsorbing desulfurization section 107. Because of this, the concentration of each component contained in the gas flowing out from the adsorbing desulfurization section 107 is measured.

The flow meter 183 measures the flow rate of the gas flowing out from the adsorbing desulfurization section 107.

To the burner 187, a fan 186 is connected. The fan 186 supplies air to the burner 187. The burner 187 combusts the gas flowing out from the adsorbing desulfurization section 107 with the air supplied by the fan 186.

These elements of the experimental device are formed of known devices and so detailed descriptions thereof will be omitted.

Experiment Example 1

In Experiment Example 1, the flow rate of the city gas (raw material gas) to be supplied to the adsorbing desulfurization section 107 was set to 1.5 L/min. by the mass flow controller 182. The concentrations of the components of the city gas to be supplied were as follows: methane: 88.9% by volume; ethane: 6.8% by volume; propane: 3.1% by volume; and butane: 1.2% by volume. The combustion heat obtained by combusting the city gas supplied from the gas infrastructure 101 was minus 67 kJ (the sign is minus because the reaction was a heat generation reaction). The adsorbing desulfurization section 107 was new. Under these conditions, the flow rate of the gas flowing out from the adsorbing desulfurization section 107 and the concentration of each component were measured.

Figure 13:
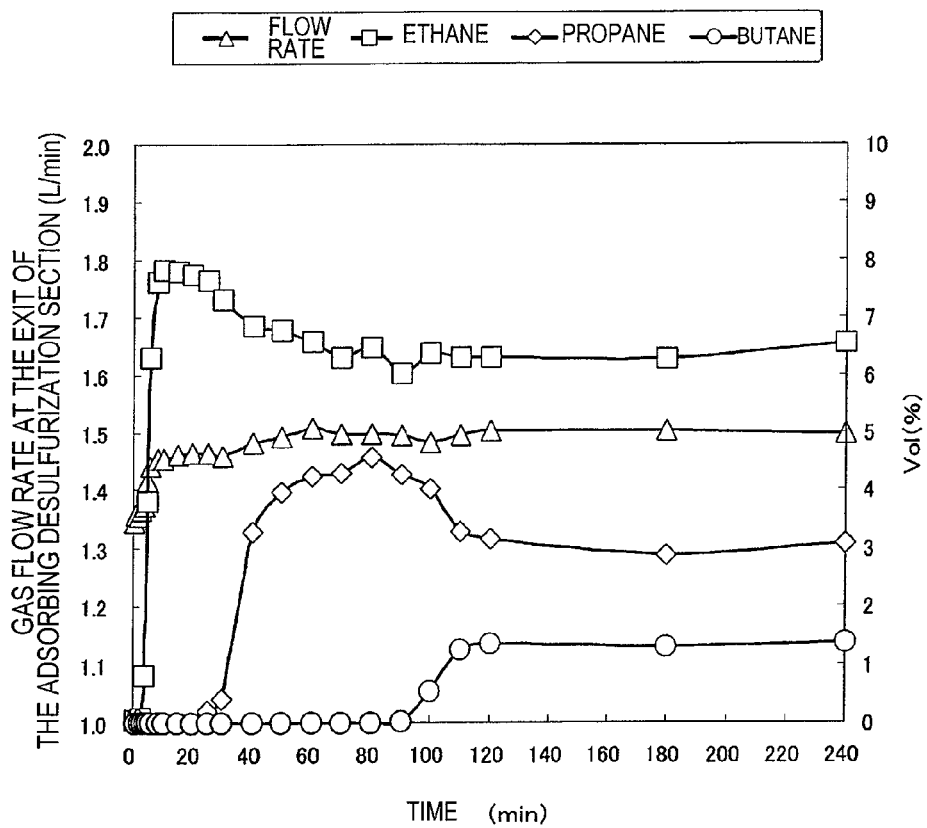
FIG. 13 is a graph showing time-wise changes, in Experiment Example 1, of the flow rate of gas flowing out from the adsorbing desulfurization section and the concentration of each component contained in the gas.
Figure 14:
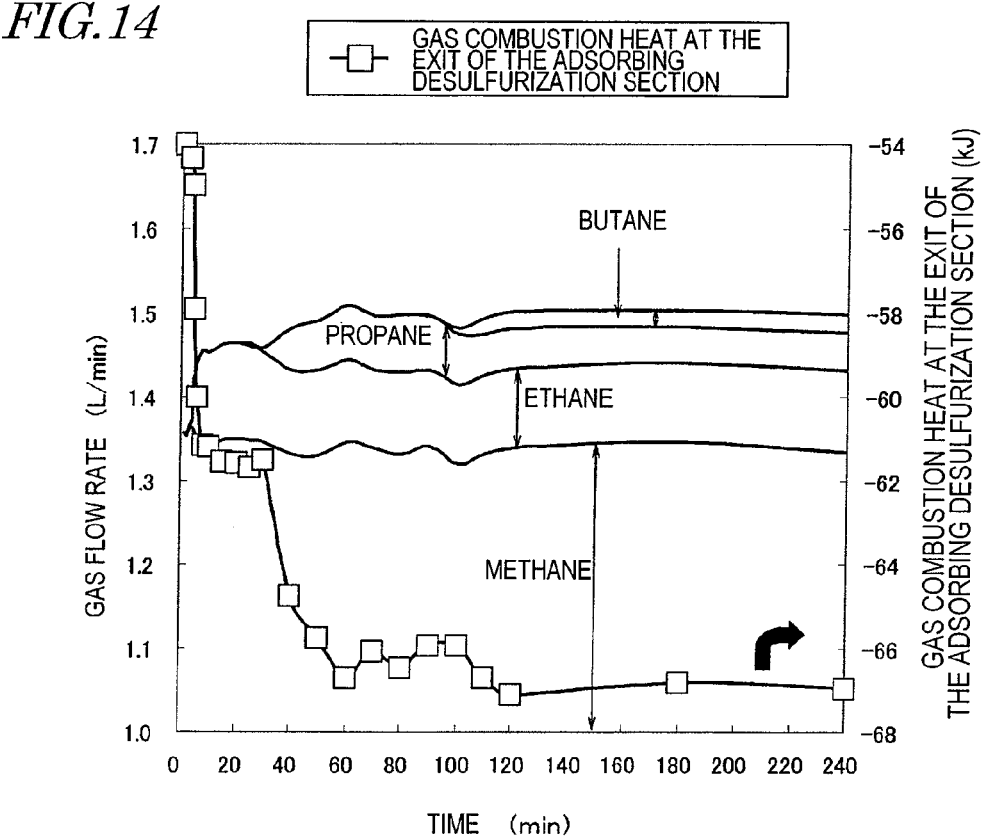
FIG. 14 is a graph showing time-wise changes, in Experiment Example 1, of the flow rate of each component of the gas flowing out from the adsorbing desulfurization section and the calculated value of the combustion heat obtained by combusting the gas flowing out from the adsorbing desulfurization section.
Figure 15:
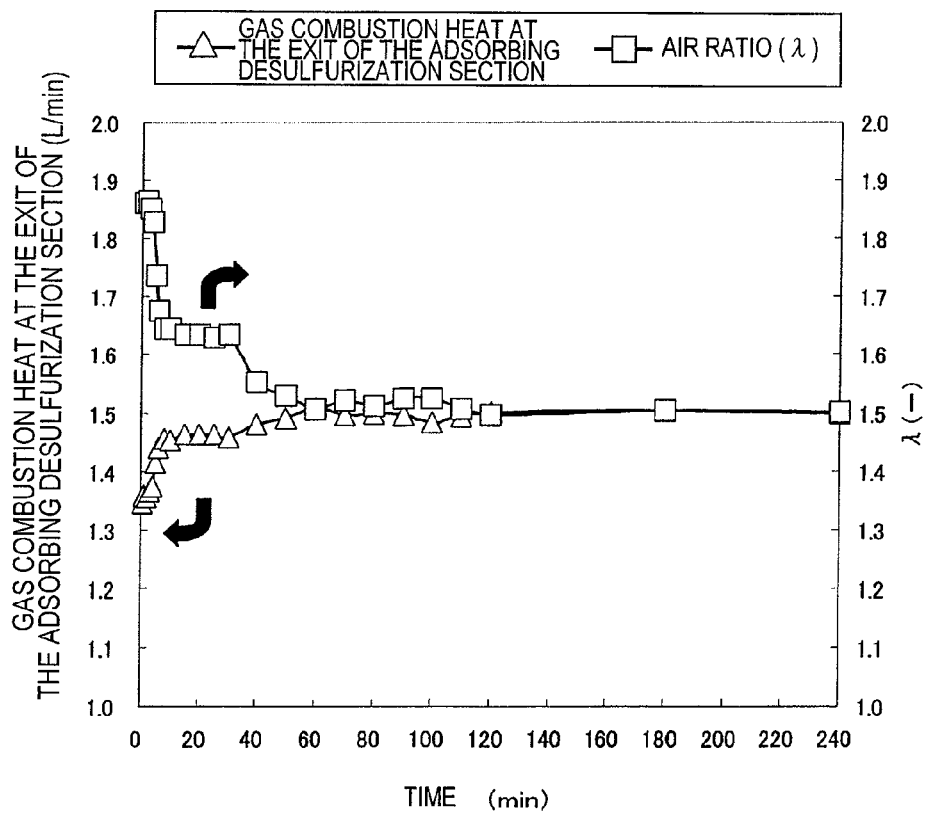
FIG. 15 is a graph showing time-wise changes, in Experiment Example 1, of the flow rate of the gas flowing out from the adsorbing desulfurization section, and of the calculated value of the air ratio in the case where air is supplied to a burner constantly in an amount calculated as being necessary to combust the city gas by the burner at $\lambda=1.5$.

FIG. 13 is a graph showing the time-wise changes, in Experiment Example 1, of the flow rate of the gas flowing out from the adsorbing desulfurization section and the concentration of each component contained in the gas. In FIG. 13, the left vertical axis represents the gas flow rate, and the right vertical axis represents the concentration of each component of the gas (% by volume). FIG. 13 shows the concentration of each of ethane, propane and butane contained in the supplied city gas, and omits the concentration of methane, which is the residual portion. FIG. 14 is a graph showing the time-wise changes, in Experiment Example 1, of the gas flow rate of each component of the gas flowing out from the adsorbing desulfurization section and the calculated value of the combustion heat obtained by combusting the gas flowing out from the adsorbing desulfurization section. In FIG. 14, the left vertical axis represents the gas flow rate of each component, and the right vertical axis represents the combustion heat. FIG. 15 is a graph showing the time-wise changes, in Experiment Example 1, of the flow rate of the gas flowing out from the adsorbing desulfurization section, and of the calculated value of the air ratio in the case where the supply amount of air necessary to combust the city gas by the burner at the air ratio ($\lambda$)=1.5 was calculated, and air was supplied to the burner constantly in this supply amount. In FIG. 15, the left vertical axis represents the gas flow rate, and the right vertical axis represents the air ratio ($\lambda$).

As shown in FIG. 13, immediately after the city gas starts to be supplied (for about 5 minutes after the start of the supply), the measured flow rate of the gas flowing out from the adsorbing desulfurization section 107 is about 1.35 L/min, which is lower than the set flow rate (1.5 L/min.) by about 10%. Immediately after the city gas starts to be supplied (for about 5 minutes after the start of the supply), the concentration of ethane contained in the gas flowing out from the adsorbing desulfurization section 107 is about 0% by volume. For 20 minutes after the start of the supply of the city gas, the concentration of propane contained in the gas flowing out from the adsorbing desulfurization section 107 is about 0% by volume. For 90 minutes after the start of the supply of the city gas, the concentration of butane contained in the gas flowing out from the adsorbing desulfurization section 107 is about 0% by volume. A conceivable reason for this is that the adsorbing agent contained in the new adsorbing desulfurization section 107 has a high adsorbing ability and so adsorbs ethane, propane and butane. A conceivable reason why butane, propane and ethane are likely to be adsorbed by the adsorbing agent is that these components have a higher boiling point than that of methane.

After that, as the time passes, the concentrations of ethane, propane and butane contained in the gas flowing out from the adsorbing desulfurization section 107 rise. Specifically, the concentration of ethane contained in the gas flowing out from the adsorbing desulfurization section 107 starts rising at about 5 minutes after the start of the supply, and, after 70 minutes pass since the start of the supply, is constant at a level substantially equal to the concentration of ethane contained in the supplied city gas (about 6.8% by volume) although slightly fluctuating. The concentration of propane contained in the gas flowing out from the adsorbing desulfurization section 107 starts rising at about 20 minutes after the start of the supply, and, after about 110 minutes pass since the start of the supply, is constant at a level substantially equal to the concentration of propane contained in the supplied city gas (about 3.1% by volume). The concentration of butane contained in the gas flowing out from the adsorbing desulfurization section 107 starts rising at about 90 minutes after the start of the supply, and, after about 120 minutes pass since the start of the supply, is constant at a level substantially equal to the concentration of butane contained in the supplied city gas (about 1.2% by volume). A conceivable reason for this is that when a certain amount of the city gas has flown through the adsorbing desulfurization section 107, the amounts of the components (ethane, propane and butane) of the city gas adsorbed by the adsorbing agent contained in the adsorbing desulfurization section 107 exceeds the adsorbing saturation amount of the adsorbing agent and so the adsorbing agent does not adsorb these components anymore. In accordance with this, after 120 minutes pass since the start of the supply, the flow rate of the gas flowing out from the adsorbing desulfurization section 107 is constant at a level substantially equal to the gas flow rate of the city gas at the time of the start of the supply (1.5 L/min.). Namely, it is considered that after 120 minutes pass since the start of the supply, the city gas flowed out from the adsorbing desulfurization section 107 while maintaining the flow rate and the composition of the city gas supplied to the adsorbing desulfurization section 107.

Now, as shown in FIG. 14, the ratio among methane, ethane, propane and butane in the flow rate of the city gas changes as the time passes. Specifically, for about 30 minutes after the city gas starts to be supplied to the adsorbing desulfurization section 107, the gas flowing out from the adsorbing desulfurization section 107 is formed of methane and ethane. At about 30 minutes after the start of the supply of the city gas to the adsorbing desulfurization section 107, propane starts to be mixed in the gas flowing out from the adsorbing desulfurization section 107. This state is continued until about 90 minutes after the start of the supply. At about 90 minutes after the start of the supply of the city gas to the adsorbing desulfurization section 107, butane starts to be mixed in the gas flowing out from the adsorbing desulfurization section 107. This state is continued. In accordance with the fluctuation of the flow rate of each of methane, ethane, propane and butane in the gas flowing out from the adsorbing desulfurization section 107, the combustion heat obtained by combusting the gas flowing out from the adsorbing desulfurization section 107 fluctuates. A conceivable reason for this is that because the combustion heat of each of methane, ethane, propane and butane is different, the combustion heat of the entirety of the gas varies in accordance with the mixing ratio of these components. After about 120 minutes pass since the start of the supply, the flow rate of each component in the gas flowing out from the adsorbing desulfurization section 107 is substantially constant, and accordingly, the combustion heat of the gas flowing out from the adsorbing desulfurization section 107 is equal to the combustion heat of the city gas supplied to the adsorbing desulfurization section 107 (minus 67 kJ).

From the above, the following was found. In the case where a certain amount (1.5 L/min. in this experiment example) of the city gas is supplied to the new adsorbing desulfurization section 107 immediately after the exchange, the adsorbing agent contained in the adsorbing desulfurization section 107 adsorbs the components of the city gas (especially, ethane, propane and butane). As a result, the composition of the gas flowing out from the adsorbing desulfurization section 107 changes, and also the gas flow rate decreases. Because of this, the amount of the combustion heat obtained by combusting the gas flowing out from the adsorbing desulfurization section 107 becomes smaller than the amount of the normal combustion heat of the city gas.

In this experiment example, an amount of air necessary to combust the city gas using the burner 187 such that the air ratio ($\lambda$) is 1.5 is calculated. In the case where the gas flowing out from the adsorbing desulfurization section 107 is combusted with the air supplied constantly in this calculated amount, the air ratio is about 1.85 immediately after the start of the supply as shown in FIG. 15. Then, the air ratio is gradually decreased as the time passes. After about 120 minutes pass since the start of the supply, the air ratio is converged to an ideal value (1.5). A conceivable reason for this is that until about 120 minutes pass since the start of the supply, the supply amount of the air was kept constant although the flow rate of the gas flowing out from the adsorbing desulfurization section 107 was fluctuated. The value of the air ratio of about 1.85 immediately after the start of the supply is deviated by about 20% from the ideal value of the air ratio. At this value, the burner 187 may be possibly put into an unstable combustion state. In this experiment example also, it was visually confirmed that when the gas flowing out from the adsorbing desulfurization section 107 was combusted immediately after the city gas started to be supplied to the adsorbing desulfurization section 107, the burner 187 was in an unstable combustion state.

Experiment Example 2

Figure 16:
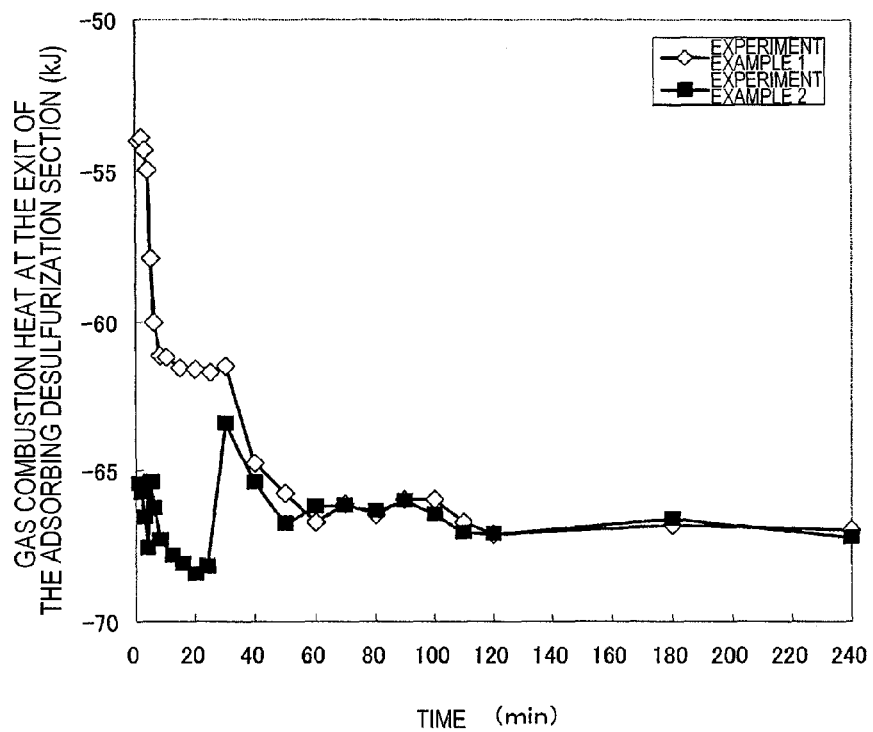
FIG. 16 is a graph comparing Experiment Examples 1 and 2 regarding the calculated value of the combustion heat obtained by combusting the gas flowing out from the adsorbing desulfurization section.

In Experiment Example 2, the city gas was supplied to the adsorbing desulfurization section 107 as follows using the mass flow controller 182. Until the accumulated flow rate of the city gas supplied to the adsorbing desulfurization section 107 reached 7 L/min., the flow rate was adjusted to 1.8 L/min.; until the accumulated flow rate reached 40 L/min. after exceeding 7 L, the flow rate was adjusted to 1.6 L/min.; and after the accumulated flow rate reached 40 L/min., the flow rate was adjusted to 1.5 L/min. In this case, the flow rate of the gas flowing out from the adsorbing desulfurization section 107 was measured by the flow meter 183, and the composition of the gas was measured by the gas chromatographer 85. From the flow rate and the composition of the gas, the combustion heat obtained by combusting the gas flowing out from the adsorbing desulfurization section 107 by the burner 187 was calculated. FIG. 16 is a graph showing the calculated values of the combustion heat generated when the gas flowing out from the adsorbing desulfurization section 107 was combusted in Experiment Examples 1 and 2.

As shown in FIG. 16, in Experiment Example 1, the amount of the combustion heat of the gas flowing out from the adsorbing desulfurization section 107 immediately after the start of the supply was small (about minus 54 kJ). Then, by the time about 10 minutes passed since the start of the supply, the amount of the combustion heat increased drastically (about minus 61 kJ). Until about 30 minutes after the start of the supply, the amount of the combustion head was substantially constant at this level (about minus 61 kJ). After about 30 minutes passed since the start of the supply until about 60 minutes after the start of the supply, the amount of the combustion heat increased again to minus 67 kJ, and then stayed substantially constant at this level.

By contrast, as shown in FIG. 16, in Experiment Example 2, from immediately after the start of the supply until 25 minutes passed since the start of the supply, the amount of the combustion heat of the gas flowing out from the adsorbing desulfurization section 107 fluctuated in the range from minus 65 kJ to minus 68 kJ. Then, at 30 minutes after the start of the supply, the amount of the combustion heat decreased drastically to minus 63 kJ. At 50 minutes after the start of the supply, the amount of the combustion heat became minus 67 kV, and then stayed substantially constant at this level.

As is clear from the above, immediately after the start of the supply and thereafter, the range of fluctuation of the amount of the combustion heat calculated in Experiment Example 2 is smaller than that calculated in Experiment Example 1. The amount of the combustion heat calculated in Experiment Example 2 is deviated with a small degree from the amount of the combustion heat (minus 67 kJ) of the city gas supplied to the adsorbing desulfurization section 107. It was found from this that where the flow rate of the city gas to be supplied to the adsorbing desulfurization section 107 is changed (decreased step by step) in accordance with the accumulated flow rate of the city gas supplied to the adsorbing desulfurization section 107, the range of fluctuation of the amount of the combustion heat of the gas flowing out from the adsorbing desulfurization section 107 is decreased.

Figure 17:
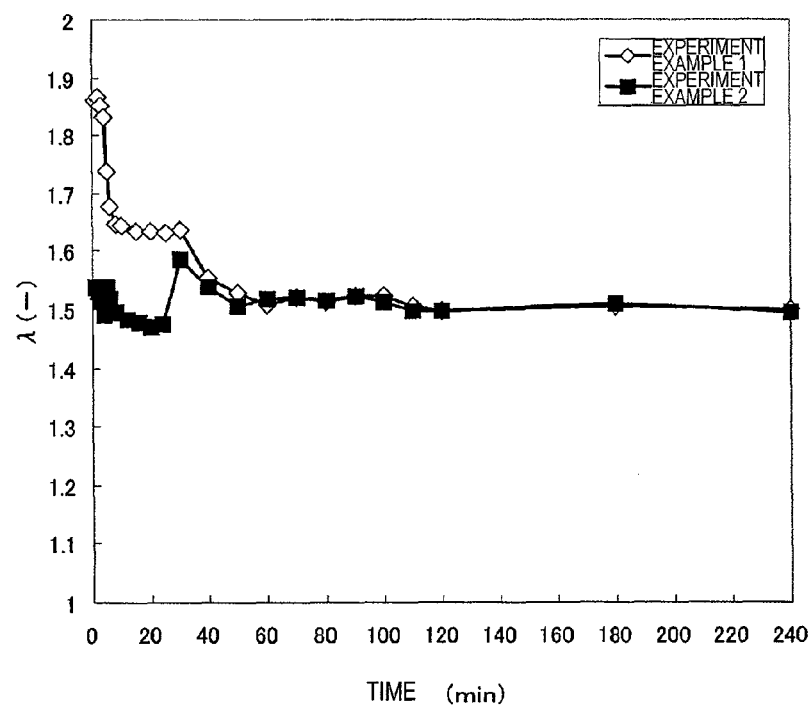
FIG. 17 is a graph comparing Experiment Examples 1 and 2 regarding the calculated value of the air ratio in the case where the air is supplied to the burner constantly in an amount calculated as being necessary to combust the city gas by the burner at $\lambda=1.5$.

In the above experiment examples, an amount of air necessary to combust the city gas using the burner 187 such that the air ratio ($\lambda$) is 1.5 was calculated, and the air was supplied to the burner 187 from the fan 186 constantly in this calculated amount to calculate the air ratio in the case where the gas flowing out from the adsorbing desulfurization section 107 is combusted. FIG. 17 is a graph comparing Experiment Examples 1 and 2 regarding the calculated value of the air ratio in the case where the air is supplied to the burner in an amount calculated as being necessary to combust the city gas by the burner at $\lambda=1.5$.

As is clear from FIG. 17, the calculated value of the air ratio in Experiment Example 2 has a smaller fluctuation range than that of the calculated value of the air ratio in Experiment Example 1. A conceivable reason for this is that because the supply amount of the city gas was changed in advance with an expectation that the new adsorbing desulfurization section 107 would adsorb the components of the city gas (mainly, ethane, methane, propane), the fluctuation range of the flow rate of the gas flowing out from the adsorbing desulfurization section 107 was narrowed

INDUSTRIAL APPLICABILITY

A hydrogen generation apparatus according to the present invention is preferably applicable to a fuel cell power generation system using a hydrocarbon-based raw material containing an odorizing component, and also is applicable to a chemical plant or the like which needs to synthesize highly pure hydrogen.

The invention claimed is:

1. A method for driving a hydrogen generation apparatus for generating hydrogen-containing gas from a raw material containing hydrocarbon and an odorizing component, the hydrogen generation apparatus comprising:
a raw material supply unit for controlling a flow rate of the raw material to be supplied from an external element;
an odorizing component removing section containing an adsorbing agent for adsorbing the odorizing component contained in the raw material;
a combustor for combusting the raw material; and
a reformer for generating hydrogen-containing gas from the raw material which has passed the odorizing component removing section by a reforming reaction using combustion heat supplied from the combustor;
wherein during driving after the adsorbing agent or the odorizing component removing section is exchanged or after the adsorbing agent is regenerated, the raw material supply unit makes the flow rate of the raw material to be supplied from the external element higher than the flow rate during the driving immediately before the exchange or regeneration.

2. A method for driving a fuel cell power generation system comprising a hydrogen generation apparatus for generating hydrogen-containing gas from a raw material containing hydrocarbon and an odorizing component, and a fuel cell for performing power generation using the hydrogen-containing gas generated by the hydrogen generation apparatus; the hydrogen generation apparatus comprising:
a raw material supply unit for controlling a flow rate of the raw material to be supplied to the hydrogen generation apparatus;
an odorizing component removing section containing an adsorbing agent for adsorbing the odorizing component contained in the raw material;
a combustor for combusting the raw material; and
a reformer for generating hydrogen-containing gas from the raw material which has passed the odorizing component removing section by a reforming reaction using combustion heat supplied from the combustor;
wherein during driving after the adsorbing agent or the odorizing component removing section is exchanged or after the adsorbing agent is regenerated, the raw material supply unit makes the flow rate of the raw material to be supplied from the external element higher than the flow rate during the driving immediately before the exchange or regeneration.

3. A method for driving a hydrogen generation apparatus for generating hydrogen-containing gas, after introducing a raw material containing hydrocarbon and an odorizing component to an odorizing component removing section for adsorbing and thus removing the odorizing component contained in the raw material, by a reforming reaction of the raw material which has passed the odorizing component removing section and water;
wherein, where a flow rate of the raw material to be supplied to the odorizing component removing section when an adsorbing ratio of the odorizing component removing section on a hydrocarbon component is substantially zero is a base flow rate, when the adsorbing ratio of the odorizing component removing section on the hydrocarbon component is higher than a prescribed value, the raw material is supplied to the odorizing component removing section in a flow rate higher than the base flow rate.

4. The method for driving the hydrogen generation apparatus of claim 1, the hydrogen generation apparatus further comprising an exchange/regeneration information acquisition unit for acquiring odorizing component removing member exchange/regeneration information which indicates that the adsorbing agent or the odorizing component removing section has been exchanged or that the adsorbing agent has been regenerated; and
wherein when the odorizing component removing member exchange/regeneration information is acquired by the exchange/regeneration information acquisition unit, the raw material supply unit makes the flow rate of the raw material higher than the flow rate during the driving immediately before the acquisition.

5. The method for driving the hydrogen generation apparatus of claim 4, wherein at least in starting processing during the driving after the exchange or regeneration, the raw material supply unit makes the flow rate of the raw material higher than the flow rate in the starting processing immediately before the exchange or regeneration.

6. The method for driving the hydrogen generation apparatus of claim 1, wherein at least in starting processing during the driving after the exchange or regeneration, the raw material supply unit increases the flow rate of the raw material higher than the flow rate in the starting processing immediately before the exchange or regeneration such that a combusting amount of the combustor is equivalent to the combusting amount of the combustor in starting processing immediately before the exchange or regeneration.

7. The method for driving the hydrogen generation apparatus of claim 1, the hydrogen generation apparatus further comprising an air supply unit for supplying combustion air to the combustor;

wherein at least in starting processing during the driving after the exchange or regeneration, the air supply unit changes a flow rate of the combustion air to be supplied to the combustor such that an air ratio of the combustor is equivalent to the air ratio of the combustor in starting processing immediately before the exchange or regeneration.

8. The method for driving the hydrogen generation apparatus of claim 5, wherein when an accumulated amount of the raw material to be supplied to the odorizing component removing section becomes equal to or larger than a prescribed threshold value during the driving after the exchange or regeneration, the raw material supply unit returns the flow rate of the raw material to the flow rate of the raw material during the driving before the exchange or regeneration.

9. The method for driving the hydrogen generation apparatus of claim 7, wherein when an accumulated amount of the raw material to be supplied to the odorizing component removing section becomes equal to or larger than a prescribed threshold value during the driving after the exchange or regeneration, the air supply unit returns the flow rate of the combustion air to be supplied to the combustor to the flow rate of the combustion air during the driving before the exchange or regeneration.

10. The method for driving the hydrogen generation apparatus of claim 8, wherein the prescribed threshold value is changed in accordance with an adsorbing ability of the odorizing component removing section on a prescribed hydrocarbon component contained in the raw material.

11. The method for driving the hydrogen generation apparatus of claim 8, wherein the raw material supply unit returns, step by step, the flow rate of the raw material to the flow rate of the raw material during the driving before the exchange or regeneration in accordance with the accumulated amount of the raw material supplied to the odorizing component removing section after the exchange or regeneration.

12. The method for driving the hydrogen generation apparatus of claim 8, wherein the raw material supply unit returns, step by step, the flow rate of the raw material to the flow rate of the raw material during the driving before the exchange or regeneration.

13. The method for driving the hydrogen generation apparatus of claim 9, wherein the air supply unit returns, step by step, the flow rate of the combustion air to be supplied to the combustor to the flow rate of the combustion air during the driving before the exchange or regeneration in accordance with the accumulated amount of the raw material supplied to the odorizing component removing section after the exchange or regeneration.

14. The method for driving the hydrogen generation apparatus of claim 9, wherein the air supply unit returns, step by step, the flow rate of the combustion air to be supplied to the combustor to the flow rate of the combustion air during the driving before the exchange or regeneration in accordance with the adsorbing ability of the odorizing component removing section.

* * * * *